(12) United States Patent
Iijima et al.

(10) Patent No.: US 6,233,029 B1
(45) Date of Patent: *May 15, 2001

(54) DISPLAY DEVICE AND ELECTRONIC APPARATUS USING THE SAME HAVING A REFLECTIVE POLARIZER BETWEEN LCD AND OPTICAL ELEMENT WHICH EMITS LIGHT RESPONSIVE TO LIGHT FROM POLARIZER

(75) Inventors: Chiyoaki Iijima; Toshihiko Tsuchihashi, both of Nagano-ken (JP)

(73) Assignee: Seiko Epson Corporation, Suwa (JP)

(*) Notice: Subject to any disclaimer, the term of this patent is extended or adjusted under 35 U.S.C. 154(b) by 0 days.

This patent is subject to a terminal disclaimer.

(21) Appl. No.: 08/914,139

(22) Filed: Aug. 19, 1997

(30) Foreign Application Priority Data

Aug. 23, 1996 (JP) ................................... 8-222562
May 9, 1997 (JP) ................................... 9-119341

(51) Int. Cl.$^7$ ................................................ G02F 1/1335
(52) U.S. Cl. ................................................ 349/96; 349/98
(58) Field of Search ............................... 349/115, 96, 98, 349/101, 99, 71, 74, 80, 117

(56) References Cited

U.S. PATENT DOCUMENTS

| | | | |
|---|---|---|---|
| 3,950,078 | * 4/1976 | Zatsky | 349/71 |
| 4,882,617 | * 11/1989 | Vriens | 358/60 |
| 4,974,219 | 11/1990 | Korth. | |
| 5,812,229 | * 9/1998 | Chen et al. | 349/117 |
| 6,025,897 | * 2/2000 | Weber et al. | 349/71 |

FOREIGN PATENT DOCUMENTS

| | | |
|---|---|---|
| 10-3078 | 1/1998 | (JP). |
| WO 95/17303 | 6/1995 | (WO). |
| WO 95/17691 | 6/1995 | (WO). |
| WO 95/17692 | 6/1995 | (WO). |
| WO 95/17699 | 6/1995 | (WO). |
| WO 95/27919 | 10/1995 | (WO). |
| WO 96/19347 | 6/1996 | (WO). |
| WO 97/01439 | 1/1997 | (WO). |
| WO 97/01440 | 1/1997 | (WO). |
| WO 97/01610 | 1/1997 | (WO). |
| WO 97/01726 | 1/1997 | (WO). |
| WO 97/01774 | 1/1997 | (WO). |
| WO 97/01778 | 1/1997 | (WO). |
| WO 97/01780 | 1/1997 | (WO). |
| WO 97/01781 | 1/1997 | (WO). |
| WO 97/01788 | 1/1997 | (WO). |
| WO 97/01789 | 1/1997 | (WO). |
| WO 97/07653 | 2/1997 | (WO). |

OTHER PUBLICATIONS

M. F. Weber, "Retroreflecting Sheet Polarizer," *SID 92 Digest*, pp. 427–429.

\* cited by examiner

*Primary Examiner*—Walter Malinowski
(74) *Attorney, Agent, or Firm*—Oliff & Berridge, PLC

(57) ABSTRACT

A display device capable of obtaining a bright display is provided. A polarizer is arranged above an TN liquid crystal, a light-scattering layer, a polarized light separator, a coloring layer, and a reflecting plate are arranged under the TN liquid crystal. The polarized light separator transmits a linearly polarized light component of a second direction of light being incident from the upper side, reflects a linearly polarized light component of a third direction perpendicular to the second direction, and can upwardly emit linearly polarized light of the second direction in response to light being incident from the lower side. In a voltage non-applied portion, light reflected by the polarized light separator becomes white emission light. In a voltage applied portion, light transmitted through the polarized light separator is colored by the coloring layer to be color emission light.

41 Claims, 14 Drawing Sheets

DISPLAY DEVICE AND ELECTRONIC APPARATUS USING THE SAME HAVING A REFLECTIVE POLARIZER BETWEEN LCD AND OPTICAL ELEMENT WHICH EMITS LIGHT RESPONSIVE TO LIGHT FROM POLARIZER

FIELD OF THE INVENTION

The present invention relates to a display device and, more preferably, to a reflection-type liquid-crystal display device.

DESCRIPTION OF RELATED ART

A conventional liquid-crystal display device using a transmission polarized light axis changing means having a polarized light axis of a TN (Twisted Nematic) liquid crystal, STN (Super-Twisted Nematic) liquid crystal, or the like employs a structure in which the transmission polarized light axis changing means is sandwiched by two polarizers. For this reason, good efficiency of light cannot be obtained, and, especially in the reflection type, a dark display is posed as a problem.

Therefore, it is an object of the present invention to provide a display device, using a transmission polarized light axis changing element, which provides a bright display.

SUMMARY OF THE INVENTION

The principle of the present invention will be described below with reference to FIGS. 1 and 2.

FIGS. 1 and 2 are views for explaining the principle of a display device according to the present invention. Liquid-crystal display devices shown in FIGS. 1 and 2 illustrate the principle of the present invention. The present invention is not limited to the liquid-crystal display devices shown in FIGS. 1 and 2 as a matter of course.

Referring to FIG. 1, in this liquid-crystal display device, a TN liquid crystal 140 is used as a transmission polarized light axis changing element. A polarizer 130 is arranged above the TN liquid crystal 140. The polarizer 130 transmits linearly polarized light of a predetermined first direction of incident light, and absorbs linearly polarized light of a direction perpendicular to the linearly polarized light of the first direction. A light-scattering layer 150, a polarized light separator 160, a colored layer 170, and a reflecting plate 180 are arranged in this order under the TN liquid crystal 140. The following description is performed on the assumption that the left side of the liquid-crystal display device serves as a voltage applied portion 110 and the right side serves as a voltage non-applied portion 120.

The polarized light separator 160 comprises a (¼) λ plate 162 and a cholesteric liquid-crystal layer 164. The cholesteric liquid crystal reflects a circularly polarized light which has a wavelength equal to the pitch of the liquid crystal and has the same rotational direction as that of the liquid crystal, and transmits other light. Therefore, for example, when a left-rotational cholesteric liquid crystal having a pitch of 5000 Å is used as the cholesteric liquid-crystal layer 164, an element which reflects left-circularly polarized light having a wavelength of 5,000 Å and transmits right-circularly polarized light and left-circularly polarized light having other wavelengths is obtained. In addition, when left-rotational cholesteric liquid crystal is used, and its pitch is changed within the cholesteric liquid crystal over the whole wavelength range of visible light, an element which reflects left-circularly polarized light over not only a single color but also white light and transmits right-circularly polarized light is obtained.

In the polarized light separator 160 obtained by combining the cholesteric liquid-crystal layer 164 and the (¼) λ plate 162 described above, when linearly polarized light of a predetermined third direction is incident from the (¼) λ plate 162, the linearly polarized light is changed by the (¼) λ plate 162 into left-circularly polarized light, reflected by the cholesteric liquidcrystal layer 164, and emitted again as linearly polarized light of the predetermined third direction by the (¼) λ plate 162. When linearly polarized light of a second direction perpendicular to the third direction is incident, the linearly polarized light is changed by the (¼) λ plate 162 into right-circularly polarized light and transmitted through the cholesteric liquid-crystal layer 164. In response to light being incident from the lower side of the cholesteric liquid-crystal layer 164, linearly polarized light of the second direction is emitted upward from the (¼) λ plate 162.

In this manner, the polarized light separator 160 obtained by combining the cholesteric liquid-crystal layer 164 and the (¼) λ plate 162 is a polarized light separation means which transmits a linearly polarized light component of the predetermined second direction of light being incident from the (¼) λ plate 162, reflects a linearly polarized light component of the third direction perpendicular to the predetermined second direction, emits linearly polarized light of the second direction to the (¼) λ plate 162 in response to light being incident from the cholesteric liquid-crystal layer 164. As a polarized light separation means having this function, in addition to the polarized light separator 160 obtained by combining the cholesteric liquid-crystal layer 164 and the (¼) λ plate 162 described above, a means using a film obtained by stacking a large number of films (U.S. Pat. No. 4,974,219), a means for separating reflection polarized light from transmission polarized light by using an angle of polarization (SID 92 DIGEST pp. 427 to 429) and a means using a hologram are known.

Referring to FIG. 1 again, in the voltage nonapplied portion 120 on the right, natural light 121 is changed by the polarizer 130 into linearly polarized light of a direction parallel to the drawing surface. Thereafter, the light is twisted at 90° in polarization direction by the TN liquid crystal 140 to be linearly polarized light of a direction perpendicular to the drawing surface, the linearly polarized light is changed by the (¼) λ plate 162 into left-circularly polarized light, and the left-circularly polarized light is reflected by the cholesteric liquid-crystal layer 164 to be incident on the (¼) λ plate 162 again. The left-circularly polarized light is changed by the (¼) λ plate 162 into linearly polarized light of a direction perpendicular to the drawing surface, and the linearly polarized light is twisted in polarization direction by the TN liquid crystal 140 to be linearly polarized light of a direction parallel to the drawing surface. The linearly polarized light is emitted from the polarizer 130 as linearly polarized light of a direction parallel to the drawing surface. In this manner, in a voltage non-applied state, since incident light is reflected by the polarized light separator 160, a bright display is obtained. Since the light-scattering layer 150 is formed between the (¼) λ plate 162 and the TN liquid crystal 140, the state of the reflected light from the polarized light separator 160 is changed from a specular state to a white state.

In the voltage applied portion 110 on the left, natural light 111 is changed by the polarizer 130 into linearly polarized light of a direction parallel to the drawing surface. Thereafter, the linearly polarized light is transmitted through the TN liquid crystal 140 without changing the polarization direction and changed by the (¼) λ plate 162 into right-circularly polarized light, and the right-circularly polarized light is transmitted through the cholesteric liquid-crystal layer 164. The right-circularly polarized light transmitted through the cholesteric liquid-crystal layer 164 is partially reflected by the coloring layer 170, incident on the (¼) λ plate 162 again, and changed by the (¼) λ plate 162 into linearly polarized light of a direction parallel to the drawing surface. The linearly polarized light is transmitted through the TN liquid crystal 140 without changing the polarization direction and emitted from the polarizer 130 as linearly polarized light of the direction parallel to the drawing surface. The right-circularly polarized light transmitted through the cholesteric liquid-crystal layer 164 is partially transmitted through the coloring layer 170 while being absorbed by the coloring layer 170, and is reflected by the reflecting plate 180. Thereafter, the reflected light is transmitted through the coloring layer 170 while being absorbed by the coloring layer 170, is reflected by the cholesteric liquid-crystal layer 164, and is transmitted through the coloring layer 170 while being absorbed by the coloring layer 170. The transmitted light is reflected by the reflecting plate 180 again, is transmitted through the coloring layer 170 while being absorbed by the coloring layer 170, and is incident on the (¼) λ plate 162 after being transmitted through the cholesteric liquid-crystal layer 164. The incident light is changed by the (¼) λ plate 162 into linearly polarized light of a direction parallel to the drawing surface. The linearly polarized light is transmitted through the TN liquid crystal 140 without changing the polarization direction and emitted from the polarizer 130 as linearly polarized light of the direction parallel to the drawing surface.

As described above, in the voltage non-applied portion 120, light reflected by the polarized light separator 160 is scattered by the light-scattering layer 150 and emitted as white emission light 122. In the voltage applied portion 110, light transmitted through the polarized light separator 160 is colored by the coloring layer 170 and emitted as color emission light 112. Therefore, a color display can be obtained on a white background. Since all the wavelengths of a visible light area are absorbed by using black in the coloring layer 170, a black display is obtained on a white background. The reflecting plate 180 brightens the color emission light 112 colored by the coloring layer 170.

Referring to FIG. 2, the polarized light separator 160 comprises the (¼) λ plate 162, the cholesteric liquid-crystal layer 164, and a (¼) λ plate 166.

In the polarized light separator 160 in which the (¼) λ plates 162 and 166 are arranged on both sides of the cholesteric liquid-crystal layer 164, when linearly polarized light of a predetermined first direction is incident from the (¼) λ plate 162, the linearly polarized light is changed by the (¼) λ plate 162 into left-circularly polarized light. The left-circularly polarized light is reflected by the cholesteric liquidcrystal layer 164 and changed by the (¼) λ plate 162 into linearly polarized light of a predetermined third direction, and the linearly polarized light is emitted. When linearly polarized light of a second direction perpendicular to the first direction is incident, the linearly polarized light is changed by the (¼) λ plate 162 into right-circularly polarized light, the right circularly polarized light is transmitted through the cholesteric liquid-crystal layer 164 and changed by the (¼) λ plate 162 into the linearly polarized light in the second direction again, and the linearly polarized light is emitted. In response to light being incident from the lower side of the (¼) λ plate 166, linearly polarized light of the second direction is emitted upward from the (¼) λ plate 162.

As described above, the polarized light separator 160 obtained by combining the cholesteric liquid-crystal layer 164 and the (¼) λ plates 162 and 166 is a polarized light separation means which transmits a linearly polarized light component of the predetermined second direction of light being incident from the (¼) λ plate 162 as linearly polarized light of the second direction, reflects a linearly polarized light component of a third direction perpendicular to the predetermined second direction, and, in response to light being incident from the (¼) λ plate 166, emits the linearly polarized light of the second direction to the (¼) λ plate 162. As a polarized light separation means having this function, in addition to the polarized light separator 160 obtained by combining the cholesteric liquid-crystal layer 164 and the (¼) λ plates 162 and 166 described above, a means using a film obtained by stacking a large number of films (U.S. Pat. No. 4,974,219), a means for separating reflection polarized light from transmission polarized light by using an angle of polarization (SID 92 DIGEST pp. 427 to 429), a means using a hologram, and a polarized light separator in which layers having different refractive indexes in a specific direction (to be described later) are alternately stacked may be used.

Referring to FIG. 2 again, the operation of the voltage non-applied portion 120 on the right is the same as that of the voltage non-applied portion 120 on the right in FIG. 1. More specifically, the natural light 121 is changed by the polarizer 130 into linearly polarized light of a direction parallel to the drawing surface. Thereafter, the linearly polarized light is twisted in polarization direction by the TN liquid crystal 140 to be linearly polarized light of a direction perpendicular to the drawing surface, and the linearly polarized light is changed by the (¼) λ plate 162 into left-circularly polarized light. The left-circularly polarized light is reflected by the cholesteric liquid-crystal layer 164, incident on the (¼) λ plate 162, and changed by the (¼) λ plate 162 into linearly polarized light of a direction perpendicular to the drawing surface. The linearly polarized light is twisted in polarization direction by the TN liquid crystal 140 to be linearly polarized light of a direction parallel to the drawing surface, and the linearly polarized light is emitted from the polarizer 130 as linearly polarized light of the direction parallel to the drawing surface. In this manner, in a voltage non-applied state, since light is not absorbed by the polarized light separator 160 but reflected by the polarized light separator 160, so a bright display is obtained. Since the light-scattering layer 150 is arranged between the (¼) λ plate 162 and the TN liquid crystal 140, the state of the reflected light from the polarized light separator 160 is changed from a specular state to a white state.

In the voltage applied portion 110 on the left, natural light 111 is changed by the polarizer 130 into linearly polarized light of a direction parallel to the drawing surface. Thereafter, the linearly polarized light is transmitted through the TN liquid crystal 140 without changing the polarization direction and changed by the (¼) λ plate 162 into right-circularly polarized light, and the right-circularly polarized light is transmitted through the cholesteric liquid-crystal layer 164. The right-circularly polarized light transmitted through the cholesteric liquid-crystal layer 164 is changed by the (¼) λ plate 166 into linearly polarized light in a direction parallel to the drawing surface. The linearly polarized light is partially reflected by the coloring layer 170, transmitted through the (¼) λ plate 166, the cholesteric liquid-crystal layer 164, and the (¼) λ plate 162 again, transmitted through the TN liquid crystal 140 as linearly polarized light of a direction parallel to the drawing surface without changing the polarization direction, and emitted from the polarizer 130 as linearly polarized light in a direction parallel to the drawing surface. The linearly polarized light emitted from the (¼) λ plate 166 is partially transmitted through the coloring layer 170 while being absorbed by the coloring layer 170 and reflected by the reflecting plate 180. Thereafter, the reflected light is transmitted through the coloring layer 170 while being absorbed by the coloring layer 170, transmitted through the (¼) λ plate 166, the cholesteric liquid-crystal layer 164, and the (¼) λ plate 162 again, transmitted through the TN liquid crystal 140 as linearly polarized light in a direction parallel to the drawing surface without changing the polarization direction, and emitted from the polarizer 130 as linearly polarized light of a direction parallel to the drawing surface.

As described above, in the voltage non-applied portion 120, light reflected by the polarized light separator 160 is scattered by the light-scattering layer 15C to be white emission light 122. In the voltage applied portion 110, light transmitted through the polarized light separator 160 is colored by the coloring layer 170 to be color emission light 112. Therefore, a color display is obtained on a white background. Since all the wavelengths of a visible light area are absorbed by using black in the coloring layer 170, a black display is obtained on a white background. Since the reflecting plate 180 is provided, the color emission light 112 colored by the coloring layer 170 becomes bright.

In the above description, the TN liquid crystal 140 is used as an example. However, even if a liquid crystal such as an STN liquid crystal or an ECB (Electrically Controlled Birefringence) liquid crystal in which other transmission polarized light axes can be changed by a voltage or the like is used in place of the TN liquid crystal 140, the same basic operation principle can be used.

The principle of the present invention when using another polarized light separator will be described below with reference to FIGS. 3 and 4.

FIG. 3 is an enlarged perspective view showing a polarized light separator used in the present invention, and FIG. 4 is a view for explaining the principle of a display device according to the present invention. The liquid-crystal display device shown in FIGS. 3 and 4 is to explain the principle of the present invention. The present invention is not limited to the liquid-crystal display device shown in FIGS. 3 and 4 as matter of course.

Referring to FIG. 4, in this liquid-crystal display device, the TN liquid crystal 140 is used as a transmission polarized light axis changing element. A polarizer 130 is arranged above the TN liquid crystal 140. The light-scattering layer 150, a polarized light separator 190, a coloring layer 170, and a reflecting plate 180 are arranged in this order under the TN liquid crystal 140. The following description is based on the assumption that the left side of the liquid-crystal display device serves as the voltage applied portion 110 and the right side serves as the voltage non-applied portion 120.

The polarized light separator 190 has a structure in which two different layers 191 (A layer) and 192 (B layer) are alternately stacked as shown in FIG. 3. In the A layer 191, a refractive index ($n_{AX}$) of an X-axis direction (first direction) is different from a refractive index ($n_{AY}$) of a Y-axis direction. In the B layer 192, a refractive index ($n_{BX}$) of the X-axis direction is equal to a refractive index ($n_{BY}$) of the Y-axis direction. The refractive index ($n_{AY}$) of the Y-axis direction in the A layer 191 is equal to the refractive index ($n_{BY}$) of the Y-axis direction in the B layer 192.

Therefore, linearly polarized light of the Y-axis direction of light being incident on the polarized light separator 190 is transmitted through the polarized light separator to be emitted as linearly polarized light in the Y-axis direction.

On the other hand, if the thickness of the A layer 191 in a Z-axis direction is represented by $t_A$, that the thickness of a B layer 52 is represented by $t_B$, and that the wavelength of incident light is represented by λ, $$t_A \cdot n_{AX} + t_B \cdot n_{BX} = \lambda \tag{1}$$

is established. In this state, of light which has the wavelength λ and is incident on the polarized light separator 190, linearly polarized light of the X-axis direction is reflected by the polarized light separator 190 as linearly polarized light in the X-axis direction.

The thickness $t_A$ of the A layer 191 in the Z-axis direction and the thickness $t_B$ of the B layer 192 in the Z-axis direction are variously changed to establish the equation (1) described above over the whole visible wavelength range. In this manner, a polarized light separator which reflects the linearly polarized light of the linearly polarized light of the X-axis direction as the linearly polarized light of the X-axis direction over not only a single color but also whole white light and transmits right-circularly polarized light and transmits light of the Y-axis direction as linearly polarized light of the Y-axis direction is obtained.

The polarized light separator as described above is disclosed as a reflective polarizer in International Unexamined Publication (WO95/17692).

As described above, in the polarized light separator 190 in which layers having different refractive indexes in the predetermined third direction (X-axis direction) are alternately stacked, when linearly polarized light of the predetermined third direction is incident from the TN liquid crystal 140, the light is reflected by the polarized light separator 190 and directly emitted as the linearly polarized in the predetermined third direction. When linearly polarized light of the second direction (Y-axis direction) perpendicular to the third direction is incident, the light is transmitted through the polarized light separator 190 and directly emitted as linearly polarized light in the predetermined second direction. In response to light being incident from the reflecting plate 180, linearly polarized light of the second direction is emitted to the TN liquid crystal 140.

Referring to FIG. 4, natural light 121 is changed by the polarizer 130 into linearly polarized light of a direction parallel to the drawing surface. Thereafter, the light is twisted 90° in polarization direction by the TN liquid crystal 140 to be linearly polarized light in a direction perpendicular to the drawing surface, and the linearly polarized light is reflected by the polarized light separator 190. The linearly polarized light in a direction perpendicular to the drawing surface is directly twisted 90° in polarization direction by the TN liquid crystal 140 to be linearly polarized light in a direction parallel to the drawing surface, and the linearly polarized light is emitted from the polarizer 130 as linearly polarized light in a direction parallel to the drawing surface. In this manner, in a voltage non-applied state, since incident light is not absorbed by the polarized light separator 190 but reflected by the polarized light separator 190, a bright display is obtained. Since the light-scattering layer 150 is formed between the polarized light separator 190 and the TN liquid crystal 140, the state of the reflected light from the polarized light separator 190 is changed from a specular state to a white state.

In the voltage applied portion 110 on the left, natural light 111 is changed by the polarizer 130 into linearly polarized light of a direction parallel to the drawing surface. Thereafter, the linearly polarized light is transmitted through the TN liquid crystal 140 and the polarized light separator 190 without changing the polarization direction. The linearly polarized light is partially reflected by the coloring layer 170, transmitted through the polarized light separator 190 again, transmitted through the TN liquid crystal 140 as linearly polarized light in a direction parallel to the drawing surface without changing the polarization direction, and emitted from the polarizer 130 as linearly polarized light in a direction parallel to the drawing surface. The linearly polarized light emitted from the polarized light separator 190 is partially transmitted through the coloring layer 170 while being absorbed by the coloring layer 170, and is reflected by the reflecting plate 180. Thereafter, the light is transmitted through the coloring layer 170 while being absorbed by the coloring layer 170 again, transmitted through the polarized light separator 190 again, transmitted through the TN liquid crystal 140 as linearly polarized light in a direction parallel to the drawing surface without changing the polarization direction, and emitted from the polarizer 130 as linearly polarized light in a direction parallel to the drawing surface.

As described above, in the voltage non-applied portion 120, light reflected by the polarized light separator 190 is scattered by the light-scattering layer 150 to be white emission light 122. In the voltage applied portion 110, light transmitted through the polarized light separator 190 is colored by the coloring layer 170 to be color emission light 112. Therefore, a color display is obtained on a white background. Since all the wavelengths of a visible light area are absorbed by using black in the coloring layer 170, a black display is obtained on a white background. Since the reflecting plate 180 is provided, the color emission light 112 colored by the coloring layer 170 becomes bright.

In the above description, the TN liquid crystal 140 is used as an example. However, even if a liquid crystal such as an STN liquid crystal or an ECB (Electrically Controlled Birefringence) liquid crystal in which other transmission polarized light axes can be changed by a voltage or the like is used in place of the TN liquid crystal 140, the same basic operation principle can be used.

The present invention is based on the above principles and, according to the present invention, there is provided a display device comprising:

transmission polarized light axis changing means for changing a transmission polarized light axis;

first and second polarized light separation means arranged on both sides of said transmission polarized light changing means holding said transmission polarized light changing means therebetween; and an optical element arranged on an opposite side of said second polarized light separation means with respect to said transmission polarized light axis changing means, said optical element emitting light of a predetermined wavelength region toward said second polarized light separation means in response to light from said second polarized light separation means, wherein said first polarized light separation means has first and second sides and emits light incident on the first side as linearly polarized light in a predetermined first direction from the second side, and emits light incident on the second side as linearly polarized light in the predetermined first direction from the first side, and said second polarized light separation means has first and second sides, the first side facing the optical element, the second side facing the transmission polarized light axis changing means, the second polarized light separation means transmitting a linearly polarized light component in a predetermined second direction of light incident on the second side to said optical element, and reflecting a linearly polarized light component in a predetermined third direction perpendicular to the predetermined second direction of light incident on the second side to said transmission polarized light axis changing means, and emitting a linearly polarized light component in the second predetermined direction of light incident on the first side to said transmission polarized light axis changing means.

In the display device of the present invention, depending on the state of the transmission polarized light axis of the transmission polarized light axis changing means, two display states, i.e., a first display state obtained by light reflected by the second polarized light separation means and a second display state obtained by light which is emitted from the optical element, is in a predetermined wavelength region, and is transmitted through the second polarized light separation means, is obtained. Since the first display state is a display state obtained by light reflect by the second polarized light separation means, a bright display is obtained.

Preferably, the second polarized light separation means transmits a linearly polarized light component of the predetermined second direction of light incident on the second side over a substantially whole wavelength range of a visible light region to said optical element, reflects a linearly polarized light component in the predetermined third direction, and emits a linearly polarized light component in the second predetermined direction of light incident on the first side over the substantially whole wavelength range in the visible light region to said transmission polarized light axis changing means.

With the above arrangement, the first and second display states are obtained in response to the light over substantially the whole wavelength range of the visible light region, and transparent reflection or white reflection is obtained in the first display state. In the second display state, a display of an arbitrary color is obtained over substantially the whole wavelength range of the visible light region depending on the optical element.

Preferably, the second polarized light separation means transmits a linearly polarized light component in the predetermined second direction of light incident on the second side to said optical element as linearly polarized light in the predetermined second direction.

Preferably, the second polarized light separation means is a laminate having a plurality of layers, adjacent ones of the layers having a same refractive index in the predetermined second direction and different refractive indexes in the predetermined third direction.

As the transmission polarized light axis changing means, a liquid-crystal element is preferably used, and a TN liquid-crystal element, an STN liquid-crystal element, or an ECB liquid-crystal element is especially preferably used. The STN liquid-crystal element also includes an STN liquid-crystal element using a color-correction optical anisotropic material.

Preferably, the first polarized light separation means is a polarizer.

Preferably, the optical element absorbs light in wavelength regions other than the predetermined wavelength region of the light from the second polarized light separation means, reflects the light in the predetermined wavelength area toward the second polarized light separation means, and transmits the light in the predetermined wavelength region.

As the optical element, an optical element which emits light in the predetermined wavelength region in response to the light from the second polarized light separation means may be used.

As the optical element, a hologram is provided which colors light from the second polarized light separation means in the predetermined wavelength region.

Preferably, reflecting means arranged on an opposite side of the optical element with respect to the second polarized light separation means is further provided, and, the reflection means reflects at least the light in the predetermined wavelength region toward the optical element is used. In this manner, the second display state by light from the optical means is made bright.

Preferably, a second optical element arranged on an opposite side of said second polarized light separation means with respect to said transmission polarized light axis changing means, said second optical element emitting light in a predetermined second wavelength region different from the predetermined first wavelength region toward said second polarized light separation means in response to light from said second polarized light separation means and being arranged at a position different from that of said optical element, wherein the display device can display light in the first predetermined wavelength region and light in the second predetermined wavelength region on a same screen. In this manner, in addition to a display of a first color by light from the optical element, a display of a second color different from the first color is obtained. As a result, a display of at least two colors is obtained.

In this case, preferably, the second optical element absorbs light in a wavelength region other than the predetermined second wavelength region of the light from the second polarized light separation means, reflects the light in the predetermined second wavelength region toward the second polarized light separation means, and transmits the light in the predetermined second wavelength region.

As the second optical element, an optical element which emits light in the predetermined second wavelength region in response to the light from the second polarized light separation means may be used.

As the second optical element, a hologram which colors light from the second polarized light separation means in the predetermined second wavelength region is preferably used.

Preferably, second reflecting means is arranged on an opposite side of the second optical element with respect to the second polarized light separation means, and, the second reflection means reflects at least the light in the predetermined second wavelength region toward the second optical element. In this manner, the second display state by light from the second optical means is made bright.

Preferably, at least one of the optical element and the second optical element is a color filter.

At least one of the optical element and the second optical element may be a phosphor.

Preferably, a third optical element is arranged on an opposite side of the second polarized light separation means with respect to the transmission polarized light axis changing means, the third optical element absorbing light over the substantially whole wavelength range of a visible light region. In this manner, in addition to a display of a first color by light from the optical element, a black display by the third optical element is obtained.

Preferably, first and second transparent substrates arranged on both sides of said transmission polarized light axis changing means to sandwich said transmission polarized light axis changing means therebetween, wherein said first polarized light separation means is arranged on an opposite side of said first transparent substrate with respect to said transmission polarized light axis changing means, and said second polarized light separation means is arranged on an opposite side of said second transparent substrate with respect to said transmission polarized light axis changing means.

In this case, preferably, as the first and second transparent substrates, glass substrates are used.

When the glass substrate is used as the second transparent substrate as described above, a so-called parallax error in which a double display is caused by the thickness of the glass substrate may easily occur. In this case, when a polychromatic display is performed in units of rows or characters in an icon portion or dots, a display in which a parallax error is negligible is obtained.

As the second transparent substrate, a plastic film substrate can also be used.

Preferably, light-scattering means is further provided. In this manner, the first display state by light reflected by the second polarized light separation means is made white.

In the display device of the present invention, an active element such as a TFT or an MIM may be provided.

Furthermore, an electronic apparatus according to the present invention comprises a display device according to claim 1. Depending on the application, the electronic apparatus may comprise any one of the above display devices.

BRIEF DESCRIPTION OF THE DRAWINGS

FIGS. 5A, 5B and 5C are views for explaining a liquid-crystal display device according to the first embodiment of the present invention, in which FIG. 5A is a plan view, FIG. 5B is an exploded sectional view, and FIG. 5C is a partially enlarged sectional view of portion A in FIG. 5B;

FIGS. 9A and 9B are views illustrating a liquid-crystal display device according to the second embodiment of the present invention, in which FIG. 9A is a plan view, and FIG. 9B is an exploded sectional view;

FIGS. 10A and 10B are views illustrating a liquid-crystal display device according to the third embodiment of the present invention, in which FIG. 10A is a plan view, and FIG. 10B is an exploded sectional view;

FIGS. 11A and 11B are views illustrating a liquid-crystal display device according to the fourth embodiment of the present invention, in which FIG. 11A is a plan view, and FIG. 11B is an exploded sectional view;

FIGS. 12A and 12B are views illustrating a liquid-crystal display device according to the fifth embodiment of the present invention, in which FIG. 12A is a plan view, and FIG. 12B is an exploded sectional view;

FIGS. 13A and 13B are views illustrating a liquid-crystal display device according to the sixth embodiment of the present invention, in which FIG. 13A is a plan view, and FIG. 13B is an exploded sectional view;

FIGS. 16A, 16B and 16C are views illustrating a liquid-crystal display device according to the seventh embodiment of the present invention, in which FIG. 16A is a plan view, FIG. 16B is an exploded sectional view, and FIG. 16C is a partially enlarged plan view.

DETAILED DESCRIPTION OF PREFERRED EMBODIMENTS

Embodiments of the present invention will be described below with reference to the accompanying drawings.

Figure 5A:
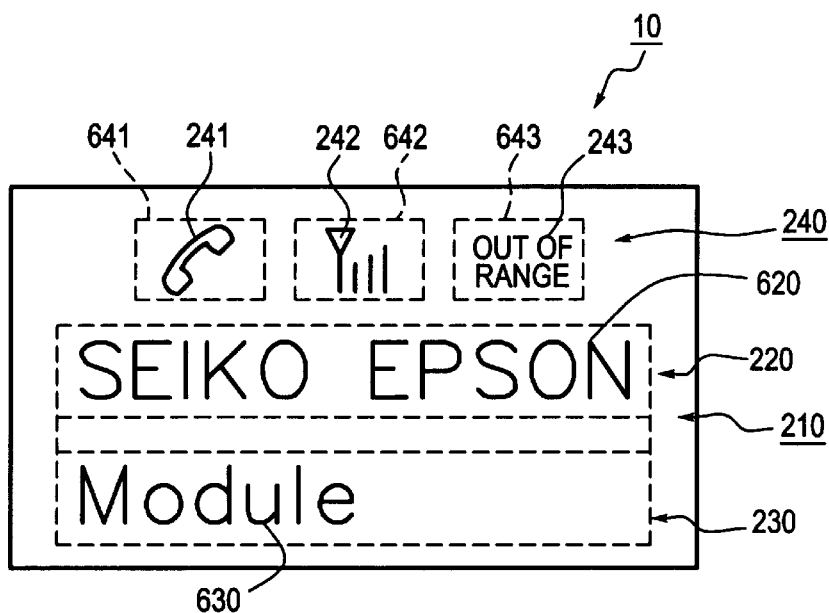
Figure 5B:
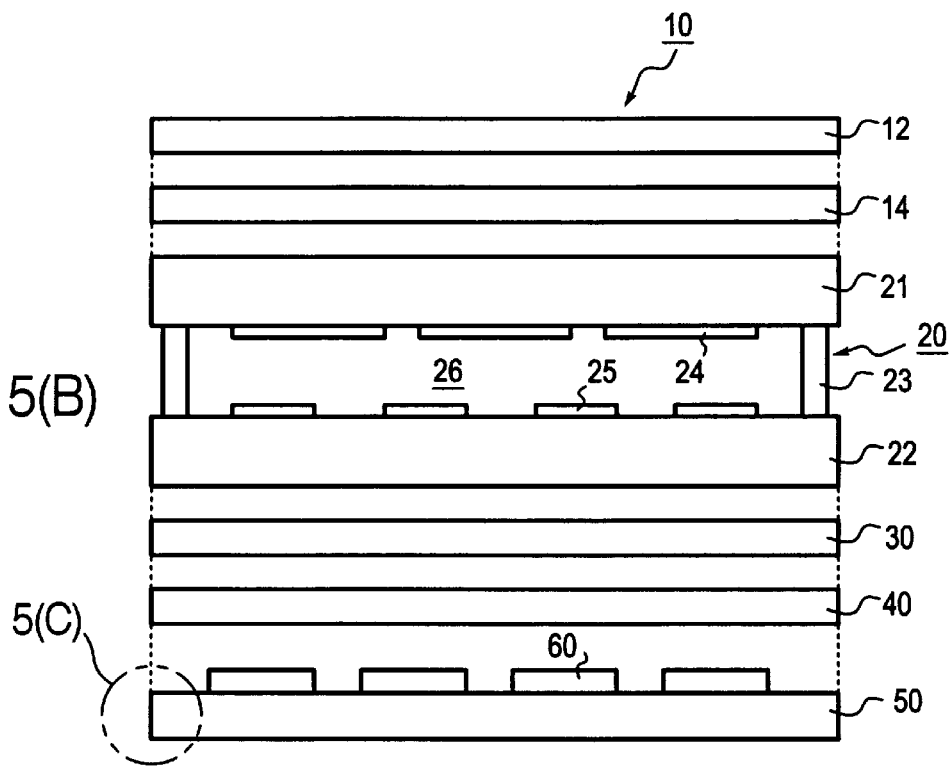
Figure 5C:
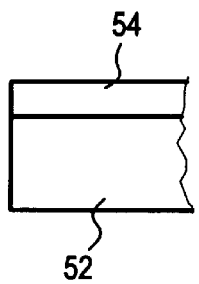
Figure 6:
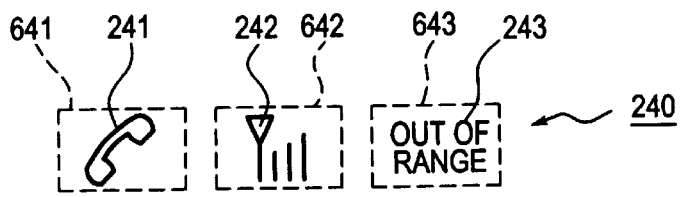
FIG. 6 is a partially enlarged plan view for explaining the liquid-crystal display device according to the first embodiment of the present invention.
Figure 7:
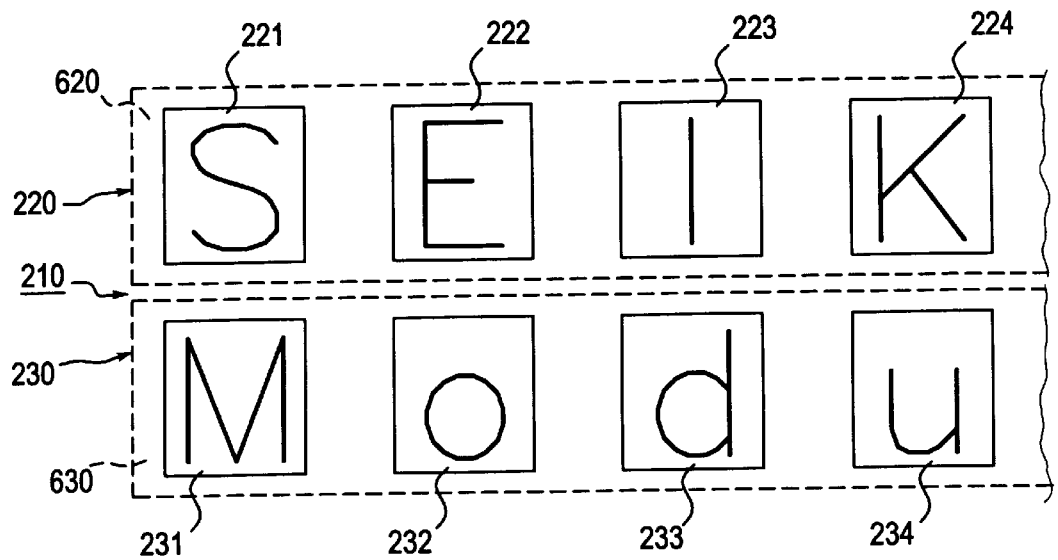
FIG. 7 is a partially enlarged plan view illustrating the liquid-crystal display device according to the first embodiment of the present invention.
Figure 8:
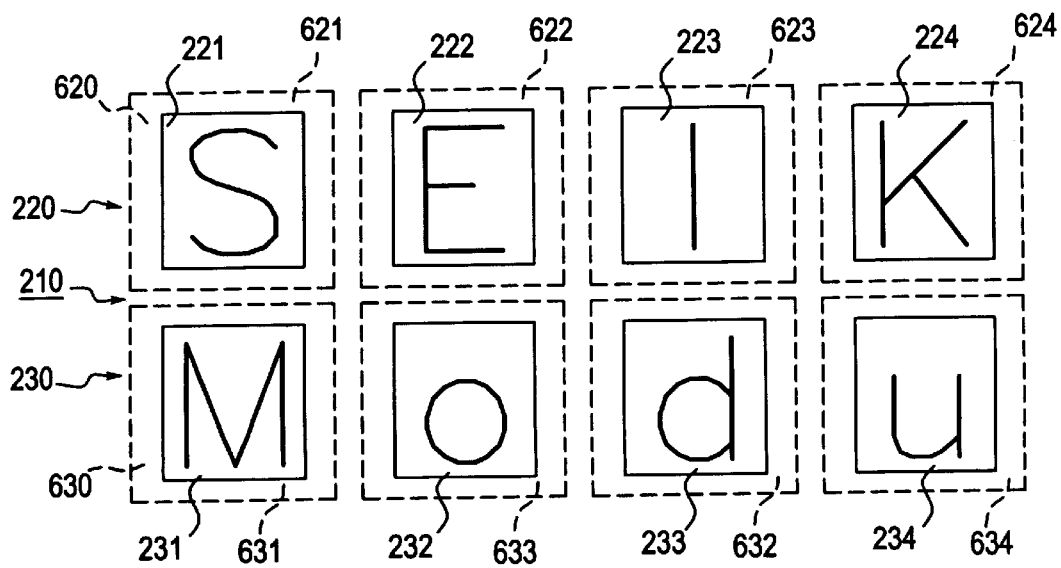
FIG. 8 is a partially enlarged plan view illustrating the liquid-crystal display device according to the first embodiment of the present invention.

FIGS. 5A–5C are views illustrating a liquid-crystal display device according to the first embodiment of the present invention, in which FIG. 5A is a plan view, FIG. 5B is an exploded sectional view, and FIG. 5C is a partially enlarged sectional view of an A portion in FIG. 5B. FIGS. 6 to 8 are partially enlarged plan views illustrating the liquid-crystal display device according to the first embodiment of the present invention.

In a liquid-crystal display device 10 according to this embodiment, an STN cell 20 is used as a transmission polarized light axis changing optical element. A phase-difference film 14 and a polarizer 12 are arranged above the STN cell 20 in this order. A diffusion plate 30, a polarized light separator 40, a color filter 60, and a reflecting plate 50 are arranged under the STN cell 20 in this order. The color filter 60 is arranged on the reflecting plate 50 by printing. In the STN cell 20, an STN liquid crystal 26 is sealed in a cell constituted by two glass substrates 21 and 22 and the sealing member 23. A transparent electrode 24 is arranged on the lower surface of the glass substrate 21, and a transparent electrode 25 is arranged on the upper surface of the glass substrate 22. As the material of the transparent electrodes 24 and 25, ITO (Indium Tin Oxide), tin oxide or the like can be used. The phase-difference film 14 is used as a color-correction optical anisotropic material to correct a color generated by the STN cell 20.

As shown in FIG. 5C, the reflecting plate 50 is manufactured by forming a deposition film 54 consisting of aluminum, silver, or the like on a substrate 52. As the substrate 52, a glass substrate, a PET (polyethylene terephthalate) substrate, a PC (polycarbonate) substrate, or the like is used. When the PET substrate is used as the substrate 52, the deposition film 54 consisting of aluminum or silver may be formed on the PET substrate after the surface of the PET substrate is coarsened.

As shown in FIG. 5A, the liquid-crystal display device 10 according to this embodiment comprises two display areas, i.e., a dot portion 210 and an icon portion 240.

The dot portion 210 comprises dot row display portions 220 and 230 constituting two rows. In correspondence with the dot row display portions 220 and 230, color filters 620 and 630 are arranged on the reflecting plate 50. As shown in FIG. 7, the dot row display portion 220 is constituted by dot display portions 221 to 224, and the dot row display portion 230 is constituted by dot display portions 231 to 234. One character or one symbol is displayed on each of the dot display portions 221 to 224 and the dot display portions 231 to 234.

The icon portion 240, as shown in FIG. 6, comprises three icons 241 to 243. In correspondence with the icons 241 to 243, color filters 641 to 643 are arranged on the reflecting plate 50.

Figure 2:
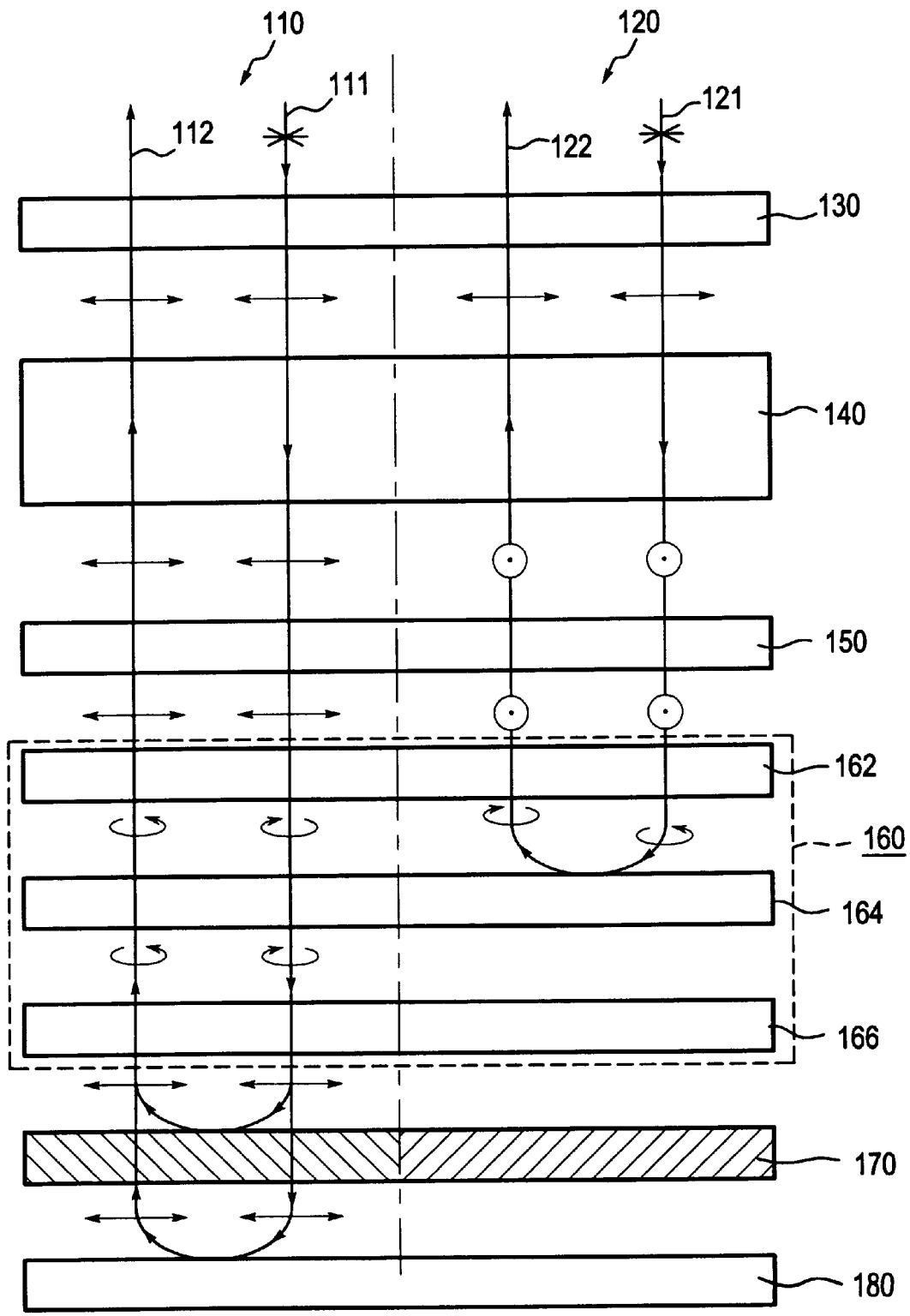
FIG. 2 is a view for explaining the principle of a display device according to the present invention.
Figure 4:
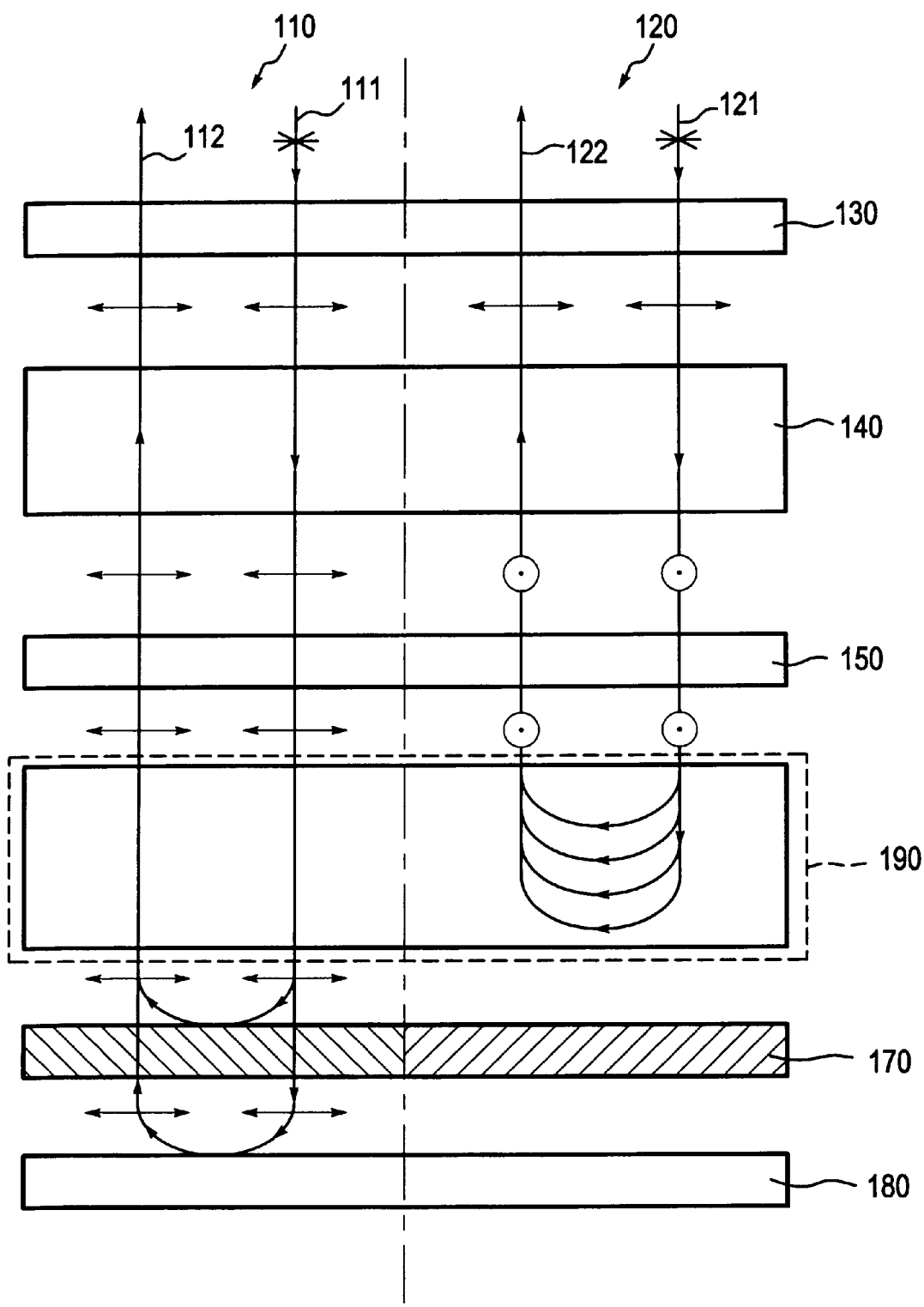
FIG. 4 is a view for explaining the principle of a display device according to the present invention.

As the polarized light separator 40 according to this embodiment, a polarized light separator described by using FIGS. 2 and 4, i.e., a polarized light separator which transmits a linearly polarized light component in a predetermined second direction of light being incident from the STN cell 20 as linearly polarized light in a second direction, reflects a linearly polarized light component of a third direction perpendicular to the predetermined second direction, and emits the linearly polarized light of the second direction to the STN cell 20 in response to light being incident from the reflecting plate 50 is used.

Figure 3:
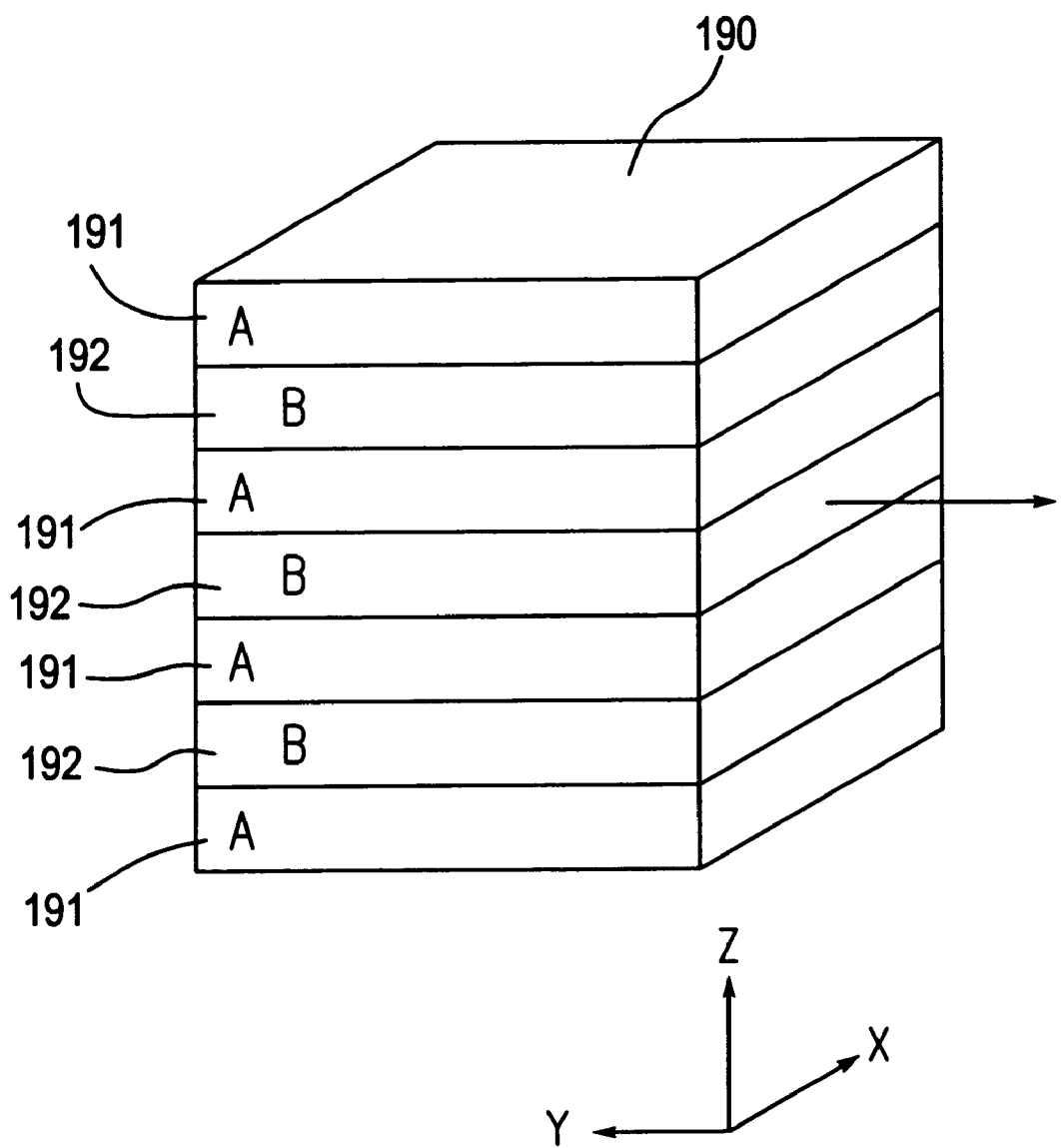
FIG. 3 is an enlarged perspective view showing a polarized light separator used in the display device according to the present invention.

As a polarized light separator having the above function, a polarized light separator obtained by interposing a cholesteric liquid-crystal layer between two (¼) λ plates, a polarized light separator using a film obtained by stacking a plurality of layers, a polarized light separator which uses an angle of polarization to separate reflected polarized light from transmission polarized light, a polarized light separator using a hologram, and a polarized light separator disclosed as a reflective polarizer in International Unexamined Publication (WO95/17692) may be used. In this embodiment, the polarized light separator 190 described by using FIG. 3, i.e., the polarized light separator disclosed as a reflective polarizer in International Unexamined Publication (WO95/17692), is used.

Figure 1:
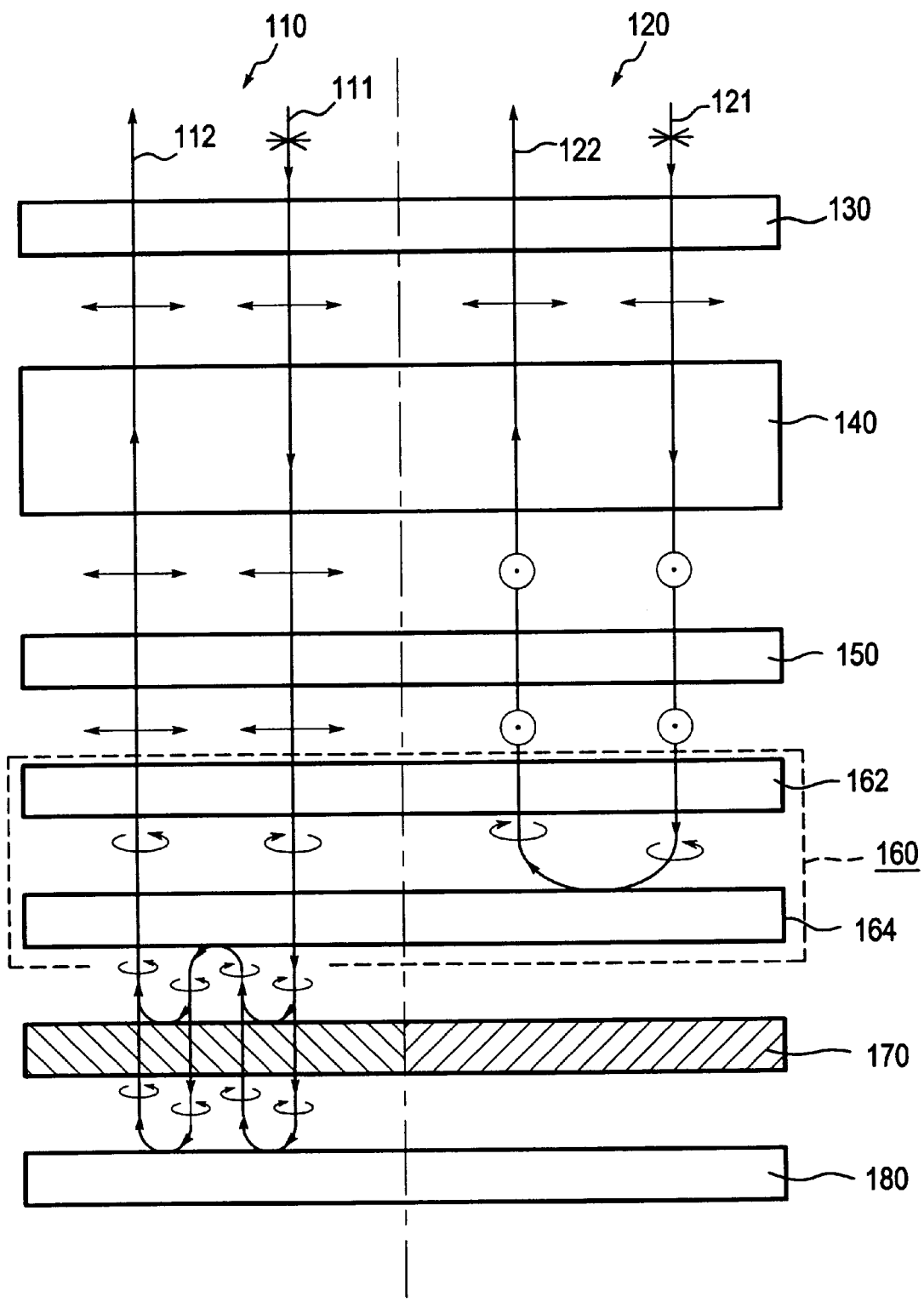
FIG. 1 is a view for explaining the principle of a display device according to the present invention.

As the polarized light separator 40 according to this embodiment, a polarized light separator described by using FIG. 1, i.e., a polarized light separator which transmits a linearly polarized light component in a predetermined second direction of light being incident from the STN cell 20, reflects a linearly polarized light component in a third direction perpendicular to the predetermined second direction, and emits the linearly polarized light of the second direction to the STN cell 20 in response to light being incident from the reflecting plate 50 can also be used.

An operation of the liquid-crystal display device 10 of this embodiment will be described below.

In a voltage non-applied area, natural light is changed by the polarizer 12 into linearly polarized light in a predetermined direction. Thereafter, the light is twisted at a predetermined angle in polarization direction by the STN cell 20 to be linearly polarized light, the linearly polarized light is not absorbed by the polarized light separator 40 but reflected by the polarized light separator 40 and twisted at a predetermined angle in polarization direction by the STN cell 20, and the light is emitted from the polarizer 12 as linearly polarized light. In this manner, in a voltage non-applied state, since incident light is not absorbed by the polarized light separator 40 but reflected by the polarized light separator 40, a bright display is obtained. Since the diffusion plate 30 is formed between the STN cell 20 and the polarized light separator 40, the state of the reflected light from the polarized light separator 40 is changed from a specular state to a white state.

In the voltage applied area, natural light is changed by the polarizer 12 into linearly polarized light in a predetermined direction. Thereafter, the linearly polarized light is transmitted through the STN cell 20 and the diffusion plate 30 as linearly polarized light and also transmitted through the polarized light separator 40 as linearly polarized light. The transmitted linearly polarized light is partially colored and reflected by the color filter 60, transmitted through the polarized light separator 40, the diffusion plate 30, the STN cell 20, and the polarizer 12, and emitted as linearly polarized light. Another part of the linearly polarized light transmitted through the polarized light separator 40 is transmitted through the color filter 60 as linearly polarized light while being absorbed by the color filter 60, and is reflected by the reflecting plate 50. Thereafter, the reflected light is transmitted through the color filter 60 again while being absorbed by the color filter 60, transmitted through the polarized light separator 40, the diffusion plate 30, the STN cell 20, and the polarizer 12, and emitted as linearly polarized light.

As described above, in the voltage non-applied area, light reflected by the polarized light separator 40 is scattered by the diffusion plate 30 to be emitted as linearly polarized light. In the voltage applied area, light transmitted through the polarized light separator 40 is colored by the color filter 60 to be color linearly polarized light. Therefore, a color display is obtained on a white background. Since all the wavelengths of a visible light area are absorbed by using black in a part of the color filter, a black display is partially obtained. Since the reflecting plate 50 is provided, a color display by the color filter 60 becomes bright.

In the liquid-crystal display device 10 according to this embodiment, the polarized light separator 40 is arranged outside the glass substrate 22 constituting the STN cell 20, and the color filter 60 and the reflecting plate 50 are arranged outside the polarized light separator 40. Therefore, a so-called parallax error in which a double display is caused by the thickness of the glass substrate 22 may easily occur. For this reason, in this embodiment, the color filter 60 is caused to correspond to a display pattern, and the color filter 60 is formed to have a size slightly larger than the display pattern.

Although a polychromatic display of a plurality of colors is obtained on a screen, the same color is always displayed on the same display pattern.

This phenomenon will be further described below with reference to FIGS. 6 to 8.

As shown in FIG. 6, in the icon portion 240, the color filters 641 to 643 are arranged in correspondence with the three icons 241 to 243. However, the sizes of the color filters 641 to 643 are set to be slightly larger than those of the icons 241 to 243, respectively. Intervals are formed between the color filters 641 to 643. In this manner, color displays in units of icons 241 to 243 can be obtained, and the icons 241 to 243 always display the same colors, respectively. Even if a small parallax error occurs, the parallax error is negligible as far as the displays of the icons 241 to 243 are seen.

As shown in FIG. 7, the dot portion 210 comprises the dot row display portions 220 and 230 constituting two rows. However, the color filters 620 and 630 are arranged for the two dot row display portions 220 and 230, respectively, the color filter 620 is formed to have a size slightly larger than the dot display portions 221 to 224 constituting the dot row display portion 220, and the color filter 630 is formed to have a size slightly larger than the dot display portions 231 to 234 constituting the dot row display portion 230. An interval is formed between the color filters 620 and 630. In this manner, displays in units of dot row display portion 220 and 230, and the dot row display portions 220 and 230 always display the same colors, respectively. Even if a small parallax error occurs, the parallax error is negligible as far as the displays of the dot row display portions 220 and 230 in units of rows are seen.

As described above, in this embodiment, color filters are arranged in units of rows. However, color filters may be arranged in units of columns to obtain color displays in units of columns.

As shown in FIG. 8, color filters 621 to 624 and 631 to 634 are arranged in correspondence with the dot display portions 221 to 224 and 231 to 234, and the color filters 621 to 624 and 631 to 634 are formed to have sizes slightly larger than those of the dot display portions 221 to 224 and 231 to 234, and intervals are formed between the color filters 621 to 624 and 631 to 634.

In this manner, displays in units of the dot display portions 221 to 224 and 231 to 234, i.e., a display in unit of one character or one symbol, is obtained, and the unit of one character or one symbol always displays the same color. For this reason, even if a small parallax error occurs, the parallax error is negligible as far as a display in unit of one character or one symbol is seen.

Figure 9A:
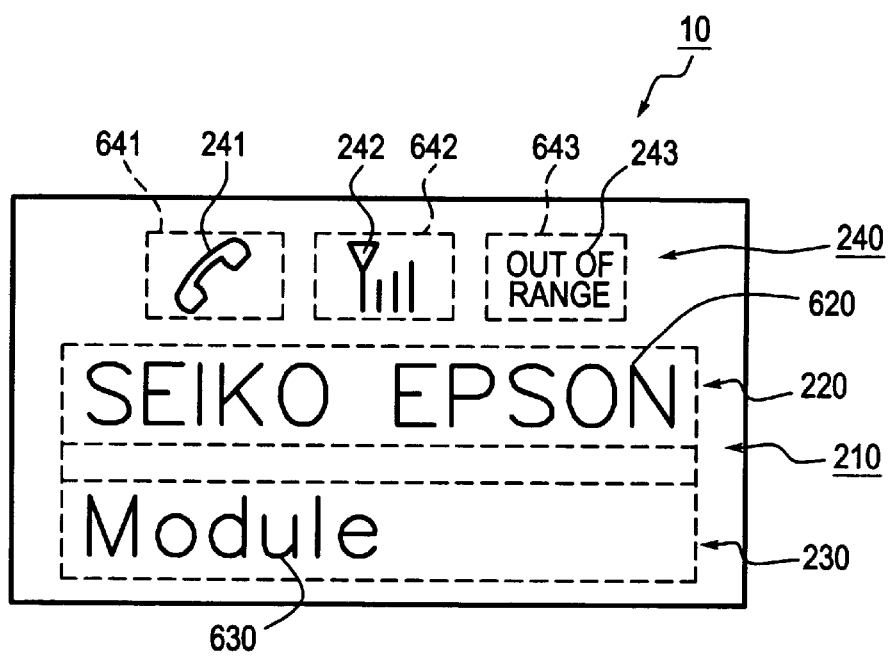
Figure 9B:
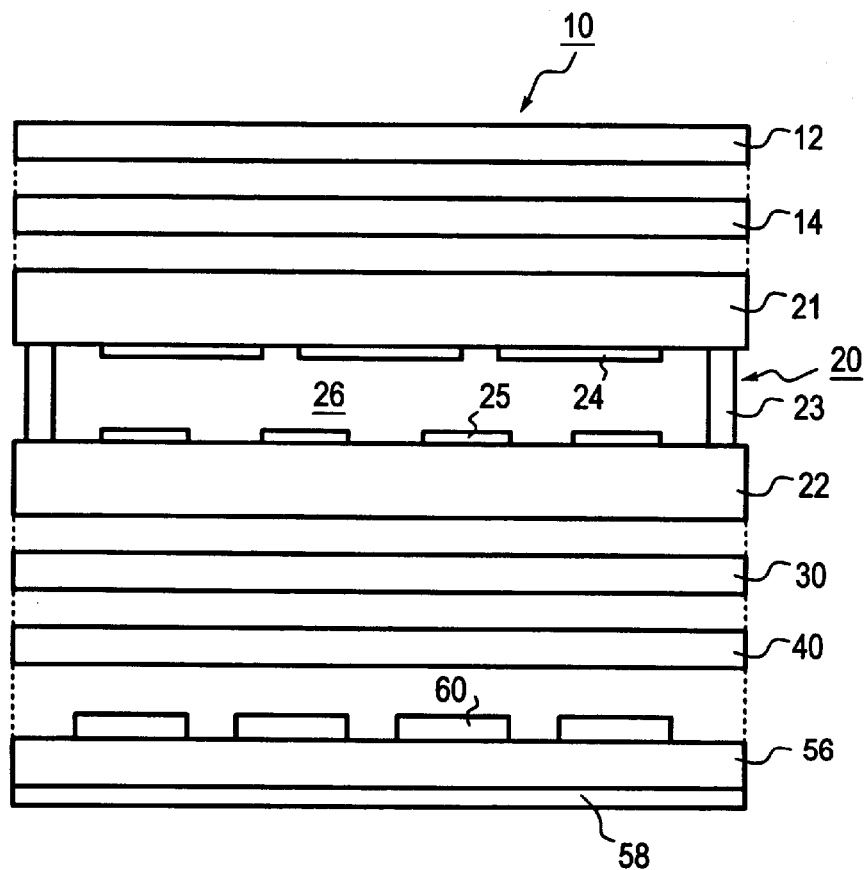

FIGS. 9A and 9B are views illustrating a liquid-crystal display device according to the second embodiment of the present invention, in which FIG. 9A is a plan view, and FIG. 9B is an exploded sectional view.

In the first embodiment, aluminum, silver, or the like is deposited on the substrate 52 to form the reflecting plate 50, and the color filter 60 is printed on the reflecting plate 50. In contrast to this, the second embodiment is the same as the first embodiment except that a color filter 60 is printed on the upper surface of a substrate 56 constituted by a glass substrate or a PET substrate, and aluminum or the like is deposited on the lower surface of the substrate 56 to form a reflecting layer.

Figure 10A:
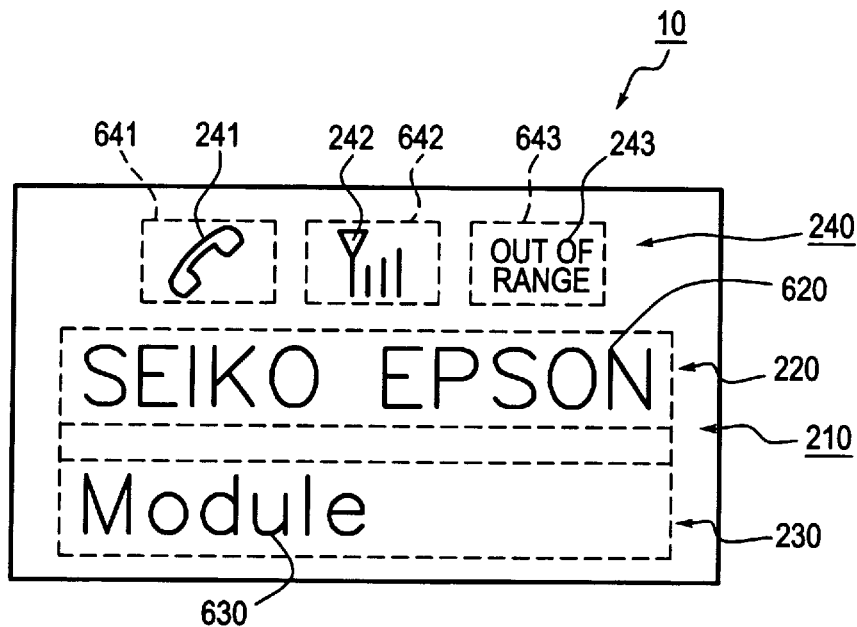
Figure 10B:
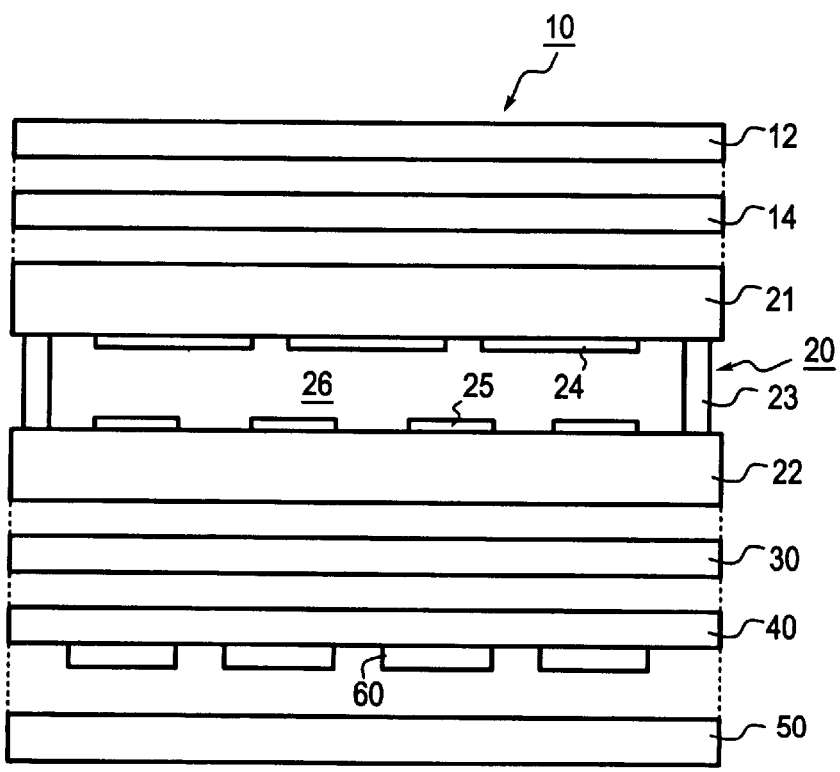

FIGS. 10A and 10B are views illustrating a liquid-crystal display device according to the third embodiment of the present invention, in which FIG. 10A is a plan view, and FIG. 10B is an exploded sectional view.

In the first embodiment, a color filter 60 is printed on a reflecting plate 50. In contrast to this, the third embodiment is the same as the first embodiment except that a color filter 60 is printed on the lower surface of a polarized light separator serving as a polarized light separator 40 and disclosed as a reflective polarizer in International Unexamined Publication WO95/17692.

Figure 11A:
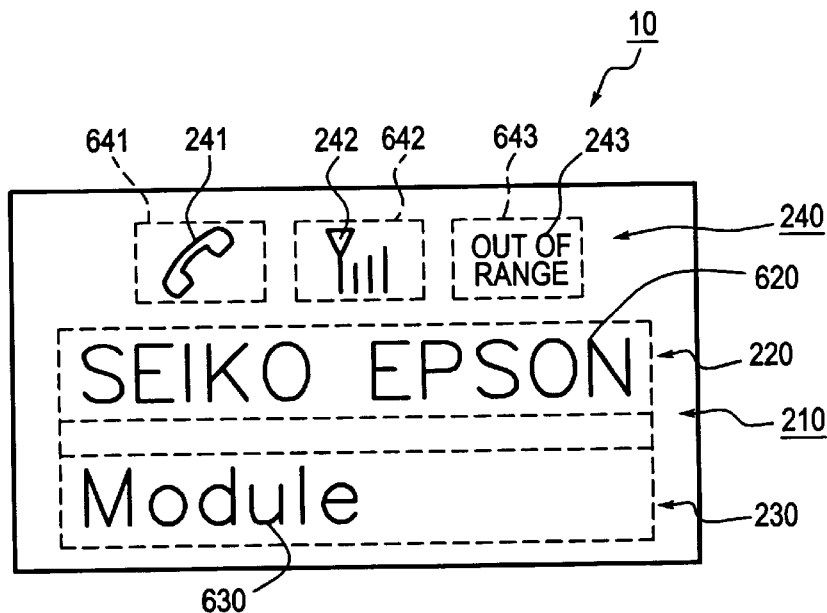
Figure 11B:
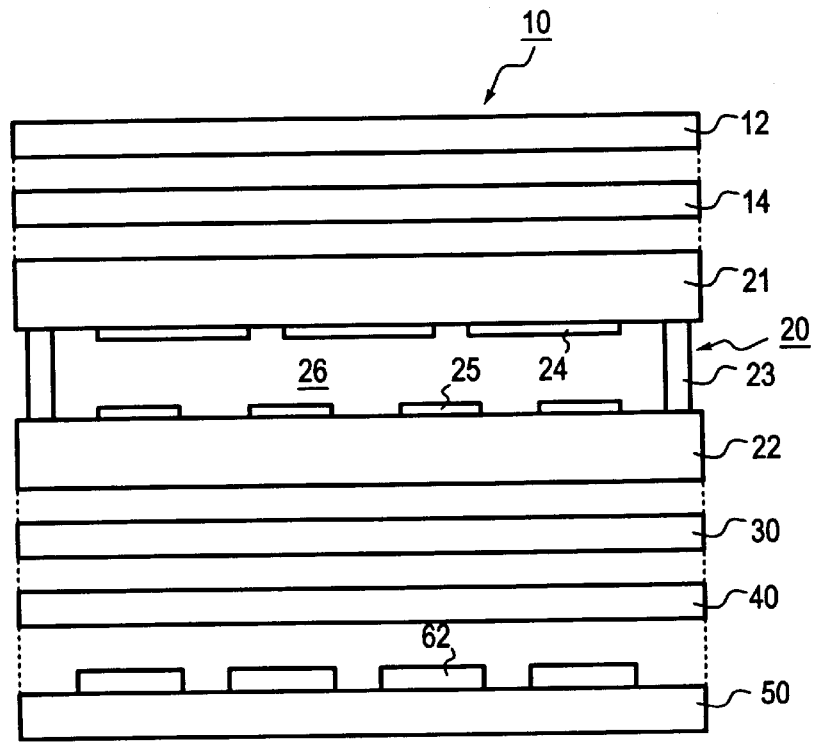

FIGS. 11A and 11B are views illustrating a liquid-crystal display device according to the fourth embodiment of the present invention, in which FIG. 11A is a plan view, and FIG. 11B is an exploded sectional view.

In the first embodiment, the color filter 60 is printed on the reflecting plate 50. In contrast to this, the fourth embodiment is the same as the first embodiment except that a fluorescent coating 62 is formed on the reflecting plate 50 in place of the color filter 60. Although the fluorescent coating 62 is properly selected to perform a color display of a plurality of colors, the same color is always displayed on the same display pattern.

Figure 12A:
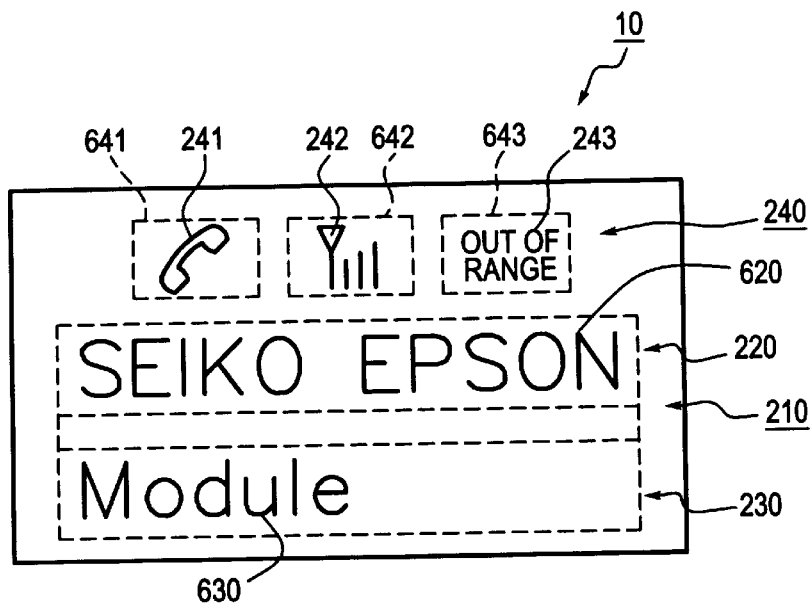
Figure 12B:
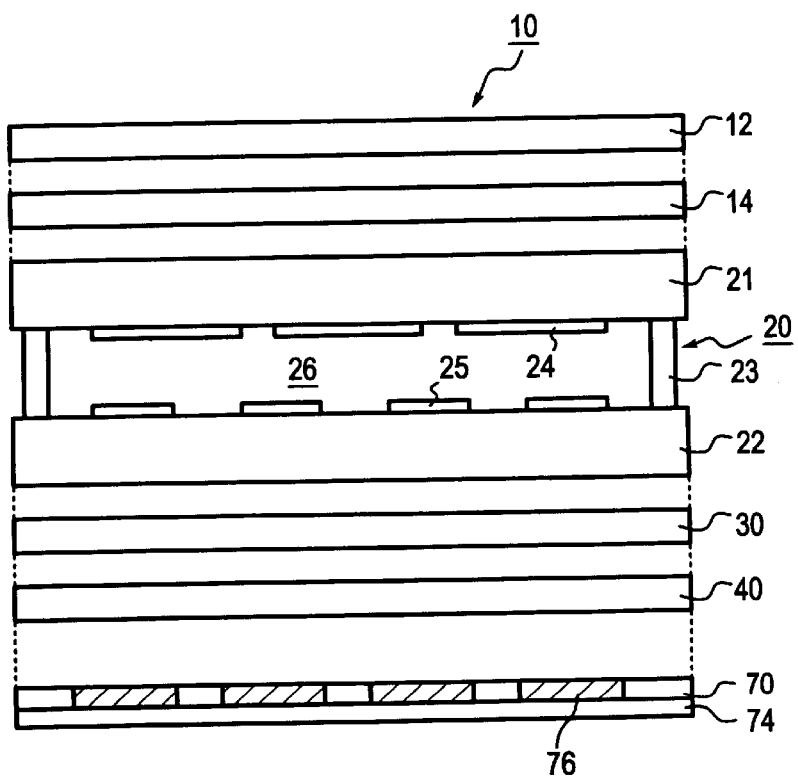

FIGS. 12A and 12B are views illustrating a liquid-crystal display device according to the fifth embodiment of the present invention, in which FIG. 12A is a plan view, and FIG. 12B is an exploded sectional view.

In the first embodiment, aluminum or silver is deposited on the substrate 52 to form the reflecting plate 50, and the color filter 60 is printed on the reflecting plate 50. In contrast to this, the fifth embodiment is the same as the first embodiment except that a film 70 consisting of PET or the like is selectively colored in a plurality of colors to form a color filter 76, and a deposition film 74 consisting of aluminum or the like is formed on the lower surface of the film 70 to form a reflecting layer.

Figure 13A:
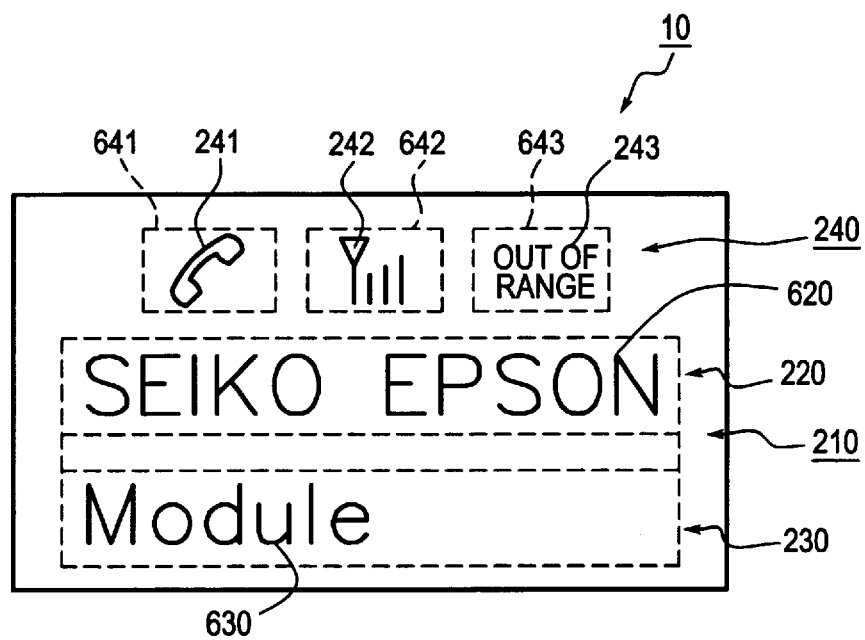
Figure 13B:
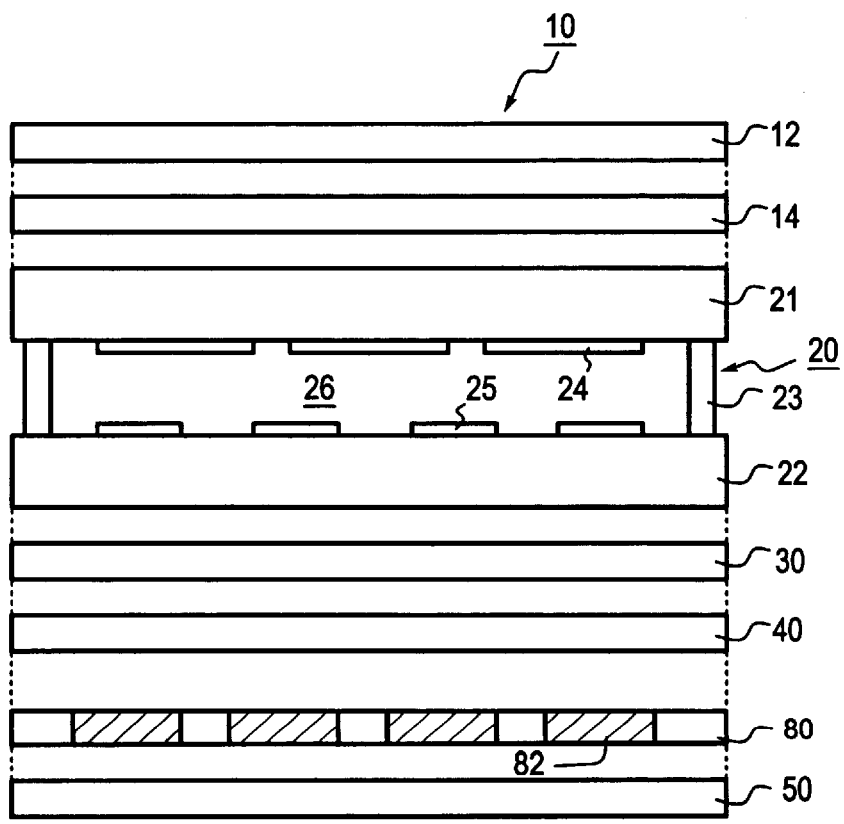
Figure 14:
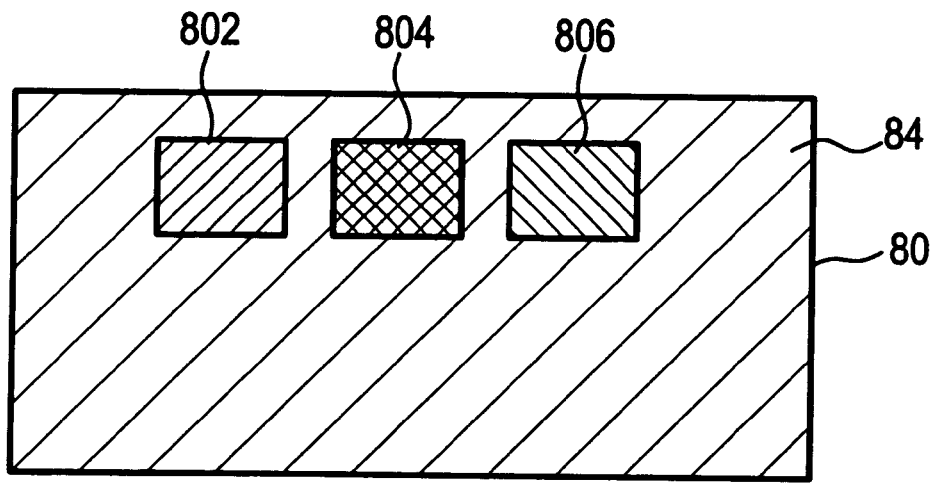
FIG. 14 is a plan view illustrating a liquid-crystal display device according to the sixth embodiment of the present invention.
Figure 15:
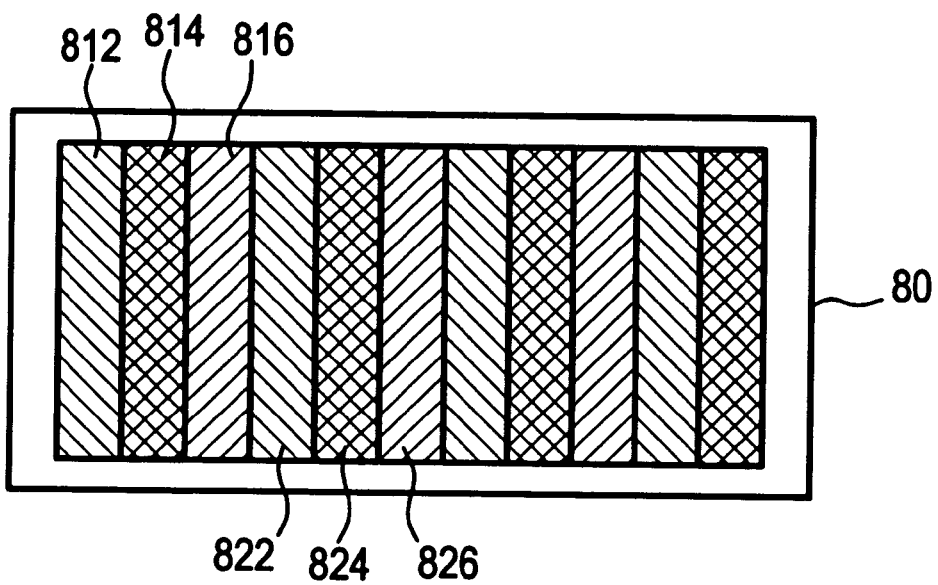
FIG. 15 is a plan view illustrating the liquid-crystal display device according to the sixth embodiment of the present invention.

FIGS. 13A and 13B are views illustrating a liquid-crystal display device according to the sixth embodiment of the present invention, in which FIG. 13A is a plan view, and FIG. 13B is an exploded sectional view. FIGS. 14 and 15 are plan views illustrating the liquid-crystal display device according to the sixth embodiment.

In the first embodiment, aluminum or silver is deposited on the substrate 52 to form the reflecting plate 50, and the color filter 60 is printed on the reflecting plate 50. In contrast to this, the sixth embodiment is the same as the first embodiment except that a hologram 80 in which a color generation area 82 for generating different colors is selectively arranged between a polarized light separator 40 and a reflecting plate 50.

In this embodiment, although color generation of the color generation area 82 is properly selected to perform a color display of a plurality of colors, the same color is always displayed on the same display pattern. For example, as shown in FIG. 14, only areas corresponding to icons may be constituted by color generation areas 802, 804, and 806 which have colors different from each other, and the remaining area may be constituted by a color generation area 84 having the same color. As shown in FIG. 15, color generation areas 812, 814, 816, 822, 824, 826, and the like in which different colors are vertically arranged in units of dots may be provided.

Figure 16A:
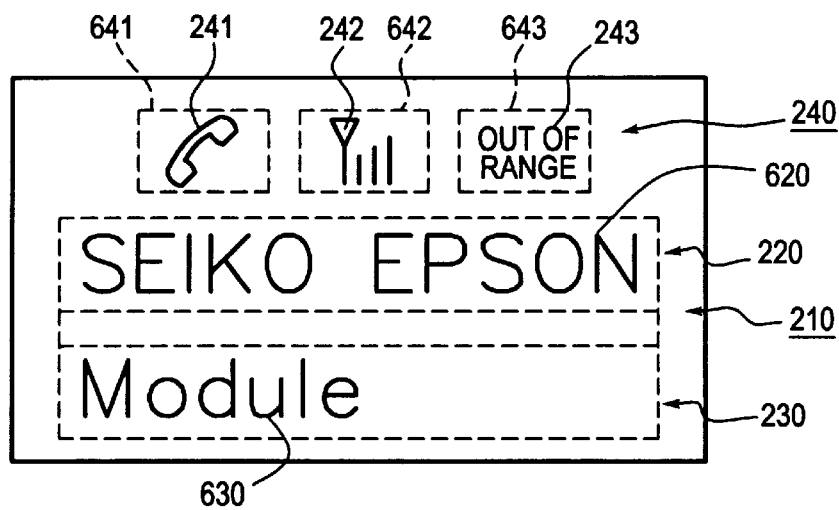
Figure 16B:
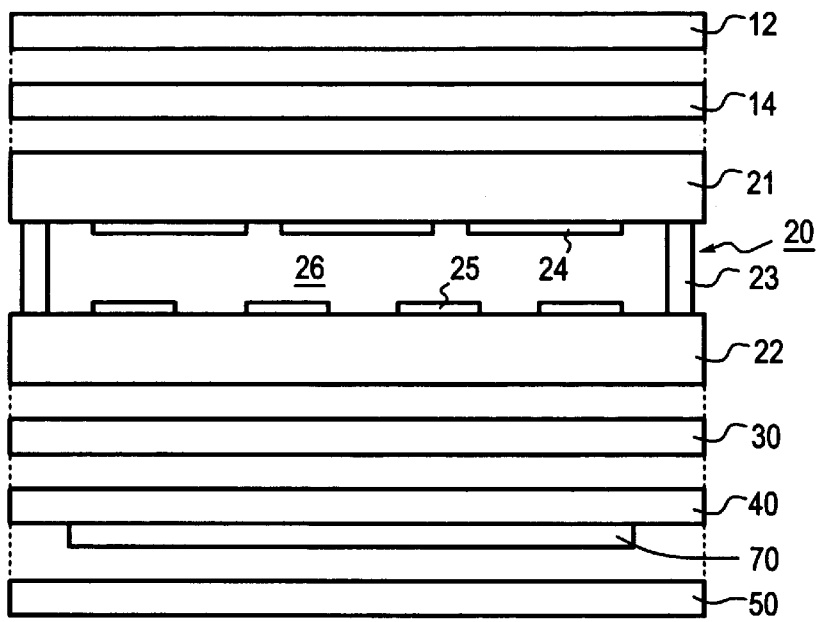
Figure 16C:
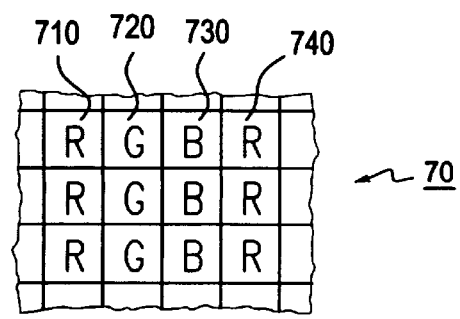

FIGS. 16A, 16B and 16C are views illustrating a liquid-crystal display device according to the seventh embodiment of the present invention, in which FIG. 16A is a plan view, FIG. 16B is an exploded sectional view, and FIG. 16C is a partially enlarged plan view.

In the first embodiment, the glass substrate 22 is used as a substrate under the STN cell 20, aluminum, silver, or the like is deposited on the substrate 52 to form the reflecting plate 50, and the color filter 60 is printed on the reflecting plate 50. In contrast to this, the seventh embodiment is the same as the first embodiment except that a plastic film 28 is used as the substrate under a STN cell 20, and a color filter 70 is formed on the lower surface of the polarized light separator 40.

In the first embodiment, since the glass substrate 22 is used as the substrate under the STN cell 20, a parallax error caused by the thickness of the glass substrate may occur. However, in the seventh embodiment, when the plastic film 28 is used as the substrate under the STN cell 20, the thickness of the plastic film 28 can be decreased. For this reason, parallax can be almost canceled, and a parallax error rarely occurs. As a result, as shown in FIG. 16C, color filters (710, 720, 730, and 740) having different colors in units of pixels can be arranged.

Figure 17:
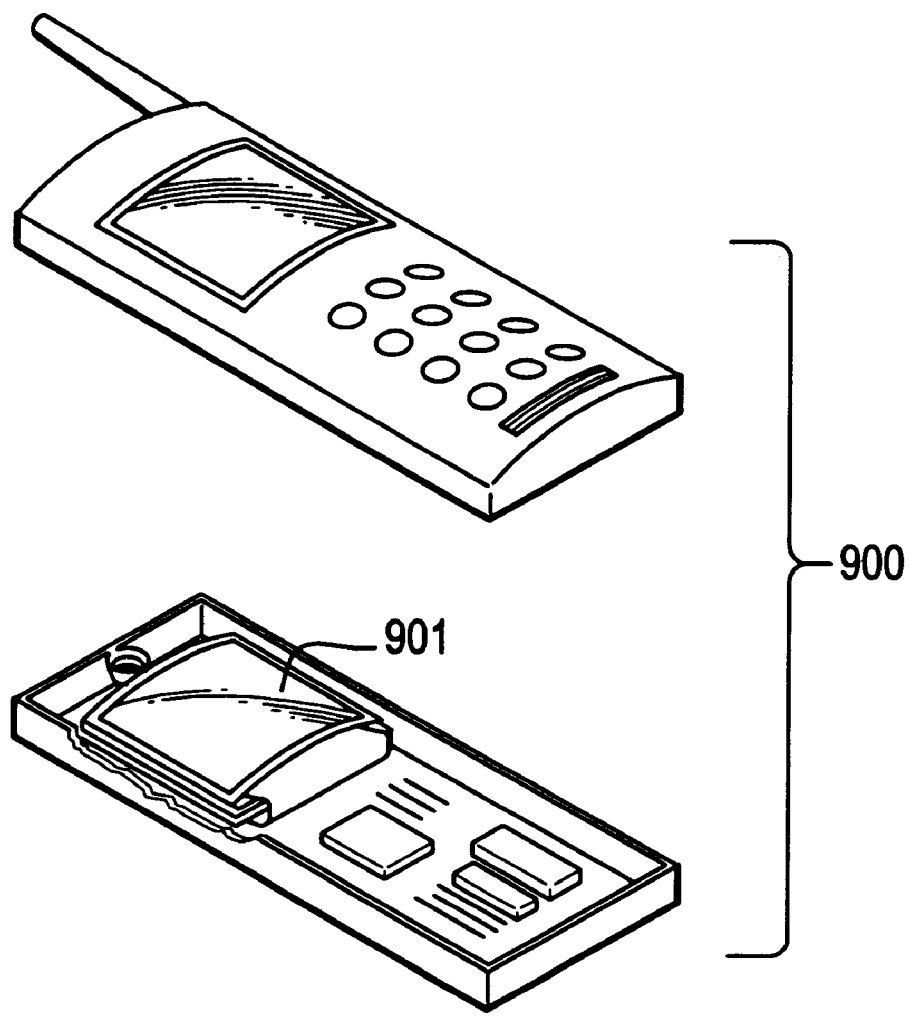
FIG. 17 shows an example of a portable telephone set in which a display device according to the present invention is arranged.

FIG. 17 shows an example of a portable telephone set in which a display device according to the present invention is arranged. In this portable telephone set 900, a display device according to the first embodiment is used as a display portion 901.

In the eighth embodiment, although the display device of the first embodiment is used, depending on the application, any one of the display devices described in the first to seventh embodiments can be used.

Although this embodiment describes a portable telephone set as an example, the display device can also be used in various electronic apparatuses such as a personal computer, a car navigation system, or an electronic organizer.

In the display device according to the present invention, the following two display states can be obtained. That is, the first display state obtained by light reflected from a second polarized light separation means depending on the state of a transmission polarized light axis of a transmission polarized light axis changing means, and the second display state obtained by light which is emitted from an optical element, of a predetermined wavelength region, and is transmitted through the second polarized light separation means. Since the first display state is obtained by light reflected by the second polarized light separation means, a display device which achieves a bright display is obtained.

As the second polarized light separation means, a polarized light separation means which transmits, in response to light over substantially the whole wavelength range of a visible light region, a linearly polarized light component in a predetermined second direction of the light being incident from the transmission polarized light axis changing means to the optical element, reflects the linearly polarized light component of a predetermined third direction perpendicular to the predetermined second direction, and emits the linearly polarized light of the predetermined second direction to the transmission polarized light axis changing means in response to light over substantially the whole wavelength range of the visible light region and is incident from the optical element is used. Therefore, the first and second display states are obtained in response to light in substantially the whole wavelength range of the visible light region, transparent reflection or white reflection is obtained in the first display state, and, in the second display state, a display of an arbitrary color is obtained in the whole wavelength range of the visible light region depending on the optical element.

What is claimed is:

1. A display device comprising:

transmission polarized light axis changing means for changing a transmission polarized light axis;

first and second polarized light separation means arranged on both sides of said transmission polarized light changing means holding said transmission polarized light changing means therebetween; and an optical element arranged on an opposite side of said second polarized light separation means with respect to said transmission polarized light axis changing means, said optical element emitting light of a predetermined wavelength region toward said second polarized light separation means in response to light from said second polarized light separation means, wherein said first polarized light separation means has first and second sides and emits light incident on the first side as linearly polarized light in a predetermined first direction from the second side, and emits light incident on the second side as linearly polarized light in the predetermined first direction from the first side, and said second polarized light separation means has first and second sides, the first side facing the optical element, the second side facing the transmission polarized light axis changing means, the second polarized light separation means transmitting a linearly polarized light component in a predetermined second direction of light incident on the second side to said optical element, and reflecting a linearly polarized light component in a predetermined third direction perpendicular to the predetermined second direction of light incident on the second side to said transmission polarized light axis changing means, and emitting a linearly polarized light component in the second predetermined direction of light incident on the first side to said transmission polarized light axis changing means.

2. A display device according to claim 1, wherein said second polarized light separation means transmits a linearly polarized light component of the predetermined second direction of light incident on the second side over a substantially whole wavelength range of a visible light region to said optical element, reflects a linearly polarized light component in the predetermined third direction, and emits a linearly polarized light component in the second predetermined direction of light incident on the first side over the substantially whole wavelength range in the visible light region to said transmission polarized light axis changing means.

3. A display device according to claim 1, wherein said second polarized light separation means transmits a linearly polarized light component in the predetermined second direction of light incident on the second side to said optical element as linearly polarized light in the predetermined second direction.

4. A display device according to claim 1, wherein said second polarized light separation means is a laminate having a plurality of layers, adjacent ones of the layers having a same refractive index in the predetermined second direction and different refractive indexes in the predetermined third direction.

5. A display device according to claim 1, wherein said transmission polarized light axis changing means is a liquid-crystal element.

6. A display device according to claim 5, wherein said transmission polarized light axis changing means is a twisted nematic liquid-crystal element, a super-twisted nematic liquid-crystal element, or an electrically-controlled birefringence liquid-crystal element.

7. A display device according to claim 1, wherein said first polarized light separation means is a polarizer.

8. A display device according to claim 1, wherein said optical element absorbs light in wavelength regions other than the predetermined wavelength region of the light from said second polarized light separation means, reflects the light in the predetermined wavelength region toward said second polarized light separation means, and transmits the light in the predetermined wavelength region.

9. A display device according to claim 8, further comprising reflecting means arranged on an opposite side of said optical element with respect to said second polarized light separation means,
wherein said reflection means reflects at least the light in the predetermined wavelength region toward said optical element.

10. A display device according to claim 8, wherein said optical element is a color filter.

11. A display device according to according to claim 1, wherein said optical element emits light in the predetermined wavelength region in response to the light from said second polarized light separation means.

12. A display device according to claim 11, wherein said optical element is a fluorescent element.

13. A display device according to claim 1, wherein said optical element is a hologram which colors the light from said second polarized light separation means in the predetermined wavelength region.

14. A display device according to claim 1, further comprising a second optical element arranged on an opposite side of said second polarized light separation means with respect to said transmission polarized light axis changing means;

said second optical element emitting light in a predetermined second wavelength region different from the predetermined wavelength region toward said second polarized light separation means in response to light from said second polarized light separation means;

said display device including first and second display areas on a screen; and said optical element being arranged corresponding to said first display area, and said second optical element being arranged corresponding to said second display area.

15. A display device according to claim 14, wherein said second optical element absorbs light in a wavelength region other than the predetermined second wavelength region of light from said second polarized light separation means, reflects light in the predetermined second wavelength region toward said second polarized light separation means, and transmits light in the predetermined second wavelength region.

16. A display device according to claim 14, wherein said second optical element emits light from said second polarized light separation means in the predetermined second wavelength region.

17. A display device according to claim 14, wherein said second optical element is a hologram which colors light from said second polarized light separation means in the predetermined second wavelength region.

18. A display device according to claim 1, further comprising first and second transparent substrates arranged on both sides of said transmission polarized light axis changing means to sandwich said transmission polarized light axis changing means therebetween,
wherein said first polarized light separation means is arranged on an opposite side of said first transparent substrate with respect to said transmission polarized light axis changing means, and
said second polarized light separation means is arranged on an opposite side of said second transparent substrate with respect to said transmission polarized light axis changing means.

19. A display device according to claim 18, wherein said first and second transparent substrates are glass substrates.

20. A display device according to claim 19, wherein a polychromatic display is performed in units of rows or characters in an icon portion or dots.

21. A display device according to claim 18, wherein said second transparent substrate is a plastic film substrate.

22. A display device according to claim 1, further comprising light-scattering means.

23. An electronic apparatus having a display device mounted thereon, comprising:
transmission polarized light axis changing means for changing a transmission polarized light axis;
first and second polarized light separation means arranged on both sides of said transmission polarized light changing means holding said transmission polarized light changing means therebetween; and
an optical element arranged on an opposite side of said second polarized light separation means with respect to said transmission polarized light axis changing means, said optical element emitting light of a predetermined wavelength region tow and said second polarized light separation means in response to light from said second polarized light separation means,
wherein said first polarized light separation means has first and second sides and emits light incident on the first side as linearly polarized light in a predetermined first direction from the second side, and emits light incident on the second side as linearly polarized light in the predetermined first direction from the first side, and said second polarized light separation means has first and second sides, the first side facing the optical element, the second side facing the transmission polarized light axis changing means, the second polarized light separation means transmitting a linearly polarized light component in a predetermined second direction of light incident on the second side toward said optical element, and reflecting a linearly polarized light component in a predetermined third direction perpendicular to the predetermined second direction of light incident on the second side to said transmission polarized light axis changing means, and emitting a linearly polarized light component in the predetermined second direction of light incident on the first side to said transmission polarized light axis changing means.

24. A display device including liquid crystal positioned between first and second substrates comprising:

a polarizer disposed on an opposite side of said liquid crystal with respect to said first substrate, the polarizer transmitting light incident thereon in a predetermined direction;

a polarized light separator disposed on an opposite side of said liquid crystal with respect to said second substrate, said polarized light separator reflecting light or transmitting light, depending on a polarized direction of said light incident on said polarized light separator from said second substrate side; and an optical element arranged on an opposite side of said a polarized light separator with respect to said second substrate, said optical element emitting colored light toward said polarized light separator in response to light from said polarized light separator.

25. A display device according to claim 24, said polarized light separator being capable of reflecting or transmitting light incident on said polarized light separator incident from said second substrate side, depending on a polarization direction of the incident light, said light being over substantially a whole wavelength range of a visible light region.

26. A display device according to claim 24, wherein said polarized light separator is a laminate having a plurality of layers, adjacent ones of the layers having a same refractive index in a predetermined direction and a different refractive index in a direction perpendicular to the predetermined direction.

27. A display device according to claim 24, said a polarized light separator being capable of reflecting or transmitting light incident on said polarized light separator depending on a polarization direction of the incident light, said light being over substantially a whole wavelength range of a visible light region.

28. A display device according to claim 24, said optical element being a fluorescent element.

29. A display device according to claim 24, said optical element being a color filter.

30. A display device according to claim 24, wherein said first and second substrates are substantially transparent and said first and second substrates are glass substrates.

31. A display device according to claim 24, said display device being a polychromatic display and displaying in units of rows or characters in an icon portion or dots.

32. A display device according to claim 24, wherein said second substrate is substantially transparent and said second substrate is a plastic film substrate.

33. A display device according to claim 24, further comprising:

a reflector arranged on an opposite side of said optical element with respect to said polarized light separator, said reflector reflecting light toward to said optical element.

34. A display device according to claim 24, further comprising a second optical element arranged on an opposite side of said polarized light separator with respect to said polarizer;

said second optical element emitting light in a second color different from the color emitted from said optical element toward said polarized light separator in response to light from said polarized light separator;

said display device including first and second display areas on a screen;

said optical element being arranged corresponding to said first display area, and said second optical element being arranged corresponding to said second display area.

35. A display device according to claim 24, said optical element being a hologram.

36. An electronic apparatus having a display device mounted thereon, said display device comprising:

liquid crystal positioned between first and second substrates;

a polarizer disposed on an opposite side of said liquid crystal with respect to said first substrate, the polarizer transmitting light incident thereon in a predetermined direction;

a polarized light separator disposed on an opposite side of said liquid crystal with respect to said second substrate, said polarized light separator reflecting light or transmitting light, depending on a polarization direction of said light incident on said polarized light separator from said second substrate side; and an optical element arranged on an opposite side of said a polarized light separator with respect to said second substrate, said optical element emitting colored light toward to said polarized light separator in response to light from said polarized light separator.

37. A display device comprising:

a liquid crystal;

a polarizer disposed on a first side of said liquid crystal, the polarizer transmitting light incident thereon in a predetermined direction;

a polarized light separator disposed on a second side of said liquid crystal, said polarized light separator reflecting light or transmitting light, depending on a polarized direction of said light incident on said polarized light separator from said second side; and a color filter arranged on an opposite side of said a polarized light separator with respect to said liquid crystal, said color filter emitting colored light toward said polarized light separator in response to light from said polarized light separator.

38. A display device according to claim 37, further comprising a second color filter arranged on an opposite side of said a polarized light separator with respect to said liquid crystal;

second color filter emitting colored light of a color different than the color of light emitted from said color filter toward said polarized light separator in response to light from said polarized light separator;

said display device including first and second display areas on a screen; and said color filter being arranged corresponding to said first display area, and said second color filter being arranged corresponding to said second display area.

39. A display device according to claim 37, said polarized light separator being capable of reflecting or transmitting light incident on said polarized light separator incident from said liquid crystal, depending on a polarization direction of the incident light, said light being over substantially a whole wavelength range of a visible light region.

40. A display device according to claim 37, wherein said polarized light separator is a laminate having a plurality of layers, adjacent ones of the layers having a same refractive index in a predetermined direction and a different refractive index in a direction perpendicular to the predetermined direction.

41. A display device according to claim 37, said a polarized light separator being capable of reflecting or transmitting light incident on said polarized light separator depending on a polarization direction of the incident light, said light being over substantially a whole wavelength range of a visible light region.

* * * * *